US011295426B2

(12) United States Patent
Horita

(10) Patent No.: US 11,295,426 B2
(45) Date of Patent: Apr. 5, 2022

(54) IMAGE PROCESSING SYSTEM, SERVER APPARATUS, IMAGE PROCESSING METHOD, AND IMAGE PROCESSING PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 67 days.

(21) Appl. No.: 16/784,278

(22) Filed: Feb. 7, 2020

(65) Prior Publication Data

US 2020/0175663 A1 Jun. 4, 2020

Related U.S. Application Data

(63) Continuation of application No. PCT/JP2018/024200, filed on Jun. 26, 2018.

(30) Foreign Application Priority Data

Aug. 9, 2017 (JP) .............................. JP2017-154305

(51) Int. Cl.
*G06K 9/00* (2006.01)
*G06T 5/50* (2006.01)
(Continued)

(52) U.S. Cl.
CPC .............. *G06T 5/50* (2013.01); *G06T 7/0002* (2013.01); *G06T 7/262* (2017.01); *G06T 7/571* (2017.01); *G06T 2207/30168* (2013.01)

(58) Field of Classification Search
CPC combination set(s) only.
See application file for complete search history.

(56) References Cited

U.S. PATENT DOCUMENTS 7,714,887 B2 * 5/2010 Nobori .................. G06T 3/4038
348/148
8,736,706 B1 * 5/2014 Valente ............ H04N 5/232133
348/222.1
(Continued)

FOREIGN PATENT DOCUMENTS

CN 103874960 A 6/2014
CN 106134178 A 11/2016
(Continued)

OTHER PUBLICATIONS

The extended European search report issued by the European Patent Office dated Jun. 25, 2020, which corresponds to European Application No. 18843671.1-1209 and is related to U.S. Appl. No. 16/784,278.
(Continued)

*Primary Examiner* — Shervin K Nakhjavan
(74) *Attorney, Agent, or Firm* — Studebaker & Brackett PC

(57) ABSTRACT

An image processing system which can decide an image processing target region considering a decrease in image quality is provided. The image processing system includes an image acquisition unit that acquires an image obtained by capturing a subject, an image quality determination information acquisition unit that acquires image quality determination information representing a determination result of an image quality in the image, an image processing target region decision unit that decides an image processing target region in the image using the image quality determination information, and an image processing unit that executes at least one of a detection process or a composition process for the image processing target region. A region represented as a logical product of two or more temporary image processing target regions respectively corresponding to two or more
(Continued)

pieces of the image quality determination information is decided as the image processing target region.

20 Claims, 22 Drawing Sheets

(51) Int. Cl.
    *G06T 7/262*     (2017.01)
    *G06T 7/571*     (2017.01)
    *G06T 7/00*     (2017.01)

(56) References Cited

U.S. PATENT DOCUMENTS

| | | | | |
|---|---|---|---|---|
| 9,373,023 | B2* | 6/2016 | Stoker | G06T 3/4053 |
| 9,898,812 | B1* | 2/2018 | Padfield | G06T 5/50 |
| 10,165,194 | B1* | 12/2018 | Baldwin | G06T 5/50 |
| 10,659,682 | B2* | 5/2020 | Sivan | G06T 7/0002 |
| 2002/0075389 | A1* | 6/2002 | Seeger | H04N 5/2628 348/222.1 |
| 2003/0161006 | A1* | 8/2003 | Kobayashi | H04N 1/4092 358/2.1 |
| 2003/0182013 | A1* | 9/2003 | Moreas | G01N 21/8901 700/145 |
| 2004/0047518 | A1* | 3/2004 | Tiana | G06T 5/50 382/284 |
| 2004/0095478 | A1* | 5/2004 | Takano | H04N 1/6086 348/223.1 |
| 2005/0053309 | A1* | 3/2005 | Szczuka | G06T 5/20 382/284 |
| 2005/0093997 | A1* | 5/2005 | Dalton | H04N 9/735 348/227.1 |
| 2006/0257050 | A1* | 11/2006 | Obrador | G06T 7/0002 382/286 |
| 2007/0091334 | A1* | 4/2007 | Yamaguchi | H04N 17/04 358/1.9 |
| 2007/0132863 | A1* | 6/2007 | Deguchi | H04N 5/23238 348/239 |
| 2007/0133901 | A1* | 6/2007 | Aiso | G06T 3/4053 382/294 |
| 2007/0206938 | A1* | 9/2007 | Tanaka | G02B 7/102 396/106 |
| 2007/0237423 | A1 | 10/2007 | Tico et al. | |
| 2008/0187234 | A1* | 8/2008 | Watanabe | G06T 5/003 382/254 |
| 2009/0196489 | A1 | 8/2009 | Le | |
| 2009/0274387 | A1* | 11/2009 | Jin | H04N 5/238 382/274 |
| 2009/0290028 | A1* | 11/2009 | Yamasaki | H04N 5/23212 348/208.1 |
| 2009/0303343 | A1* | 12/2009 | Drimbarean | G06T 5/009 348/222.1 |
| 2010/0194931 | A1* | 8/2010 | Kawaguchi | H04N 5/23222 348/240.99 |
| 2011/0205395 | A1* | 8/2011 | Levy | H04N 5/23229 348/229.1 |
| 2011/0249910 | A1* | 10/2011 | Henderson | G06K 9/00134 382/278 |
| 2012/0062694 | A1* | 3/2012 | Muramatsu | G06T 5/50 348/36 |
| 2012/0148109 | A1* | 6/2012 | Kawamura | G02B 7/38 382/106 |
| 2012/0275671 | A1* | 11/2012 | Eichhorn | G06T 7/0004 382/128 |
| 2012/0293610 | A1 | 11/2012 | Doepke et al. | |
| 2013/0050546 | A1* | 2/2013 | Kano | H04N 5/35721 348/280 |
| 2013/0142451 | A1* | 6/2013 | Reibman | G06T 7/0002 382/284 |
| 2013/0162779 | A1* | 6/2013 | Yamamoto | H04N 13/20 348/46 |
| 2013/0308866 | A1* | 11/2013 | Lin | G06K 9/46 382/195 |
| 2013/0315556 | A1* | 11/2013 | Ju | H04N 5/23248 386/224 |
| 2014/0184852 | A1* | 7/2014 | Niemi | H04N 5/2356 348/239 |
| 2014/0192162 | A1 | 7/2014 | Aoki et al. | |
| 2014/0267883 | A1* | 9/2014 | Vidal-Naquet | H04N 5/2351 348/362 |
| 2015/0085179 | A1* | 3/2015 | Van Heugten | H04N 5/232133 348/349 |
| 2015/0245009 | A1* | 8/2015 | Tozuka | H04N 13/257 348/46 |
| 2016/0006938 | A1* | 1/2016 | Haruki | H04N 5/2356 348/208.3 |
| 2016/0093032 | A1* | 3/2016 | Lei | G06T 11/00 382/264 |
| 2016/0203593 | A1* | 7/2016 | Henkemeyer | G06K 9/6262 382/152 |
| 2016/0342848 | A1 | 11/2016 | Seki et al. | |
| 2017/0004603 | A1 | 1/2017 | Irie et al. | |
| 2017/0068840 | A1* | 3/2017 | Chaki | G06K 9/40 |
| 2017/0140509 | A1* | 5/2017 | Lee | H04N 5/23264 |
| 2018/0035058 | A1* | 2/2018 | Thumpudi | G06T 7/90 |
| 2018/0286020 | A1* | 10/2018 | Kawai | H04N 5/23229 |
| 2021/0304471 | A1* | 9/2021 | Mitsumoto | G06T 7/0002 |

FOREIGN PATENT DOCUMENTS

| | | |
|---|---|---|
| EP | 3096286 A1 | 11/2016 |
| JP | H10-232206 A | 9/1998 |
| JP | 2004072533 A | 3/2004 |
| JP | 2007305050 A | 11/2007 |
| JP | 2010258673 A | 11/2010 |
| JP | 2016099235 A | 5/2016 |

OTHER PUBLICATIONS

An Office Action mailed by the Japanese Patent Office dated Apr. 12, 2021, which corresponds to Japanese Patent Application No. 2019-535016 and is related to U.S. Appl. No. 16/784,278.

An Office Action mailed by the China National Intellectual Property Administration dated Jun. 4, 2021, which corresponds to Chinese Application No. 201880046943.4 and is related to U.S. Appl. No. 16/784,278; with English language translation.

International Search Report issued in PCT/JP2018/024200; dated Sep. 25, 2018.

International Preliminary Report On Patentability issued in PCT/JP2018/024200; dated Feb. 8, 2019.

An Office Action issued by the State Intellectual Property Office of the People's Republic of China dated Jan. 19, 2022, which corresponds to Chinese Patent Application No. CN 201880046943.4.

* cited by examiner

FIG. 12
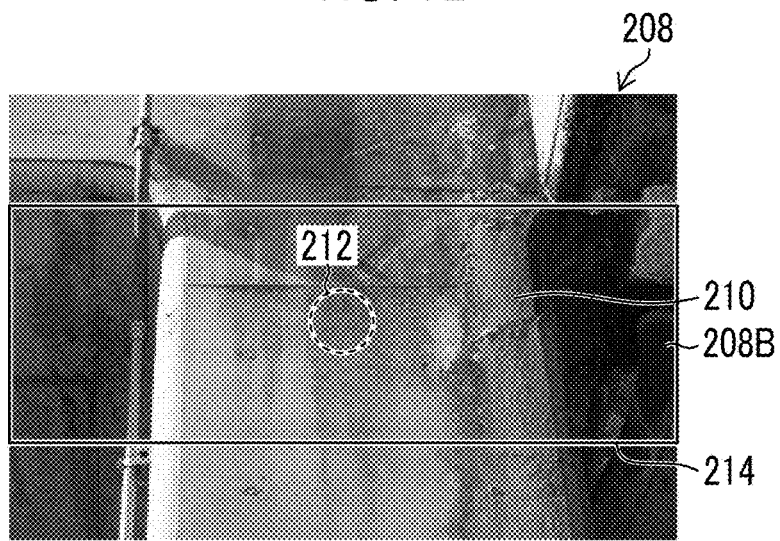
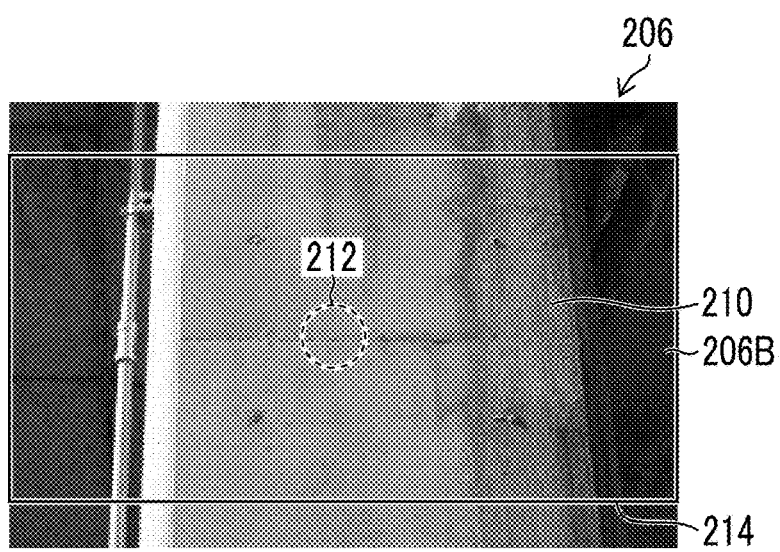
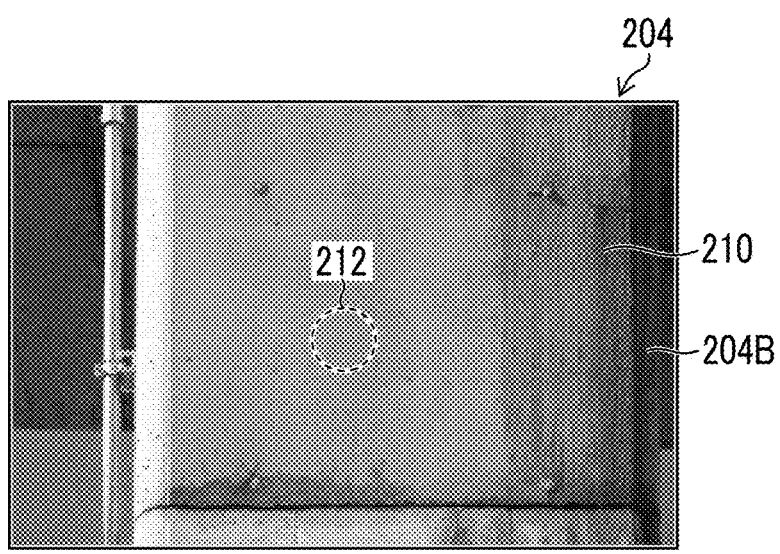

FIG. 13
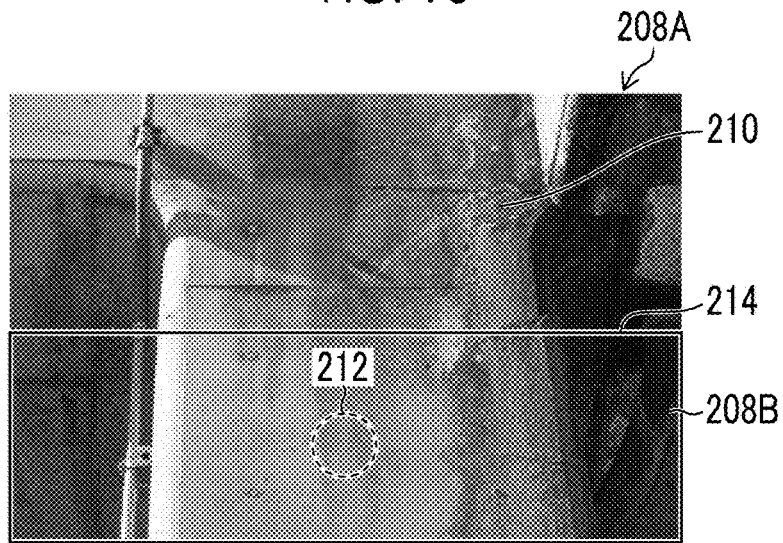
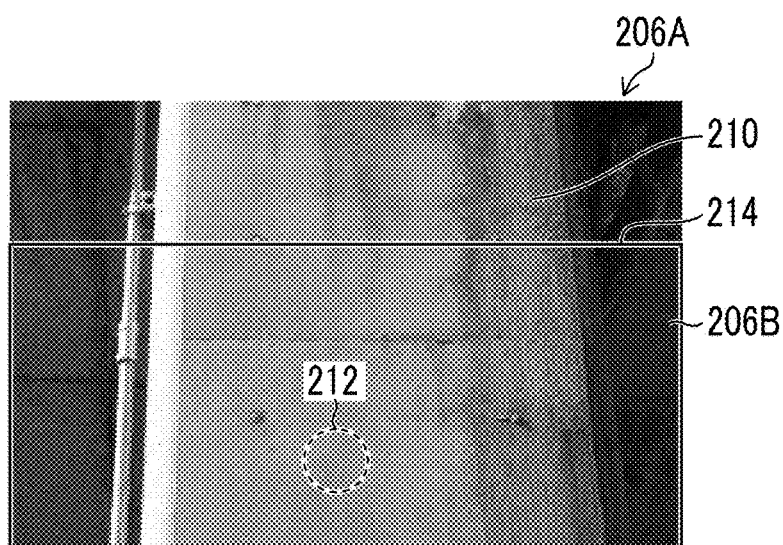
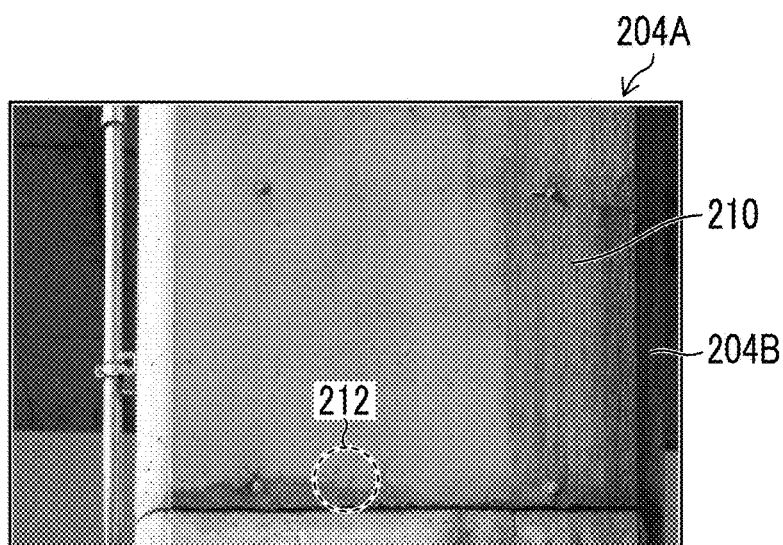

IMAGE PROCESSING SYSTEM, SERVER APPARATUS, IMAGE PROCESSING METHOD, AND IMAGE PROCESSING PROGRAM

CROSS-REFERENCE TO RELATED APPLICATIONS

The present application is a Continuation of PCT International Application No. PCT/JP2018/024200 filed on Jun. 26, 2018 claiming priority under 35 U.S.C § 119(a) to Japanese Patent Application No. 2017-154305 filed on Aug. 9, 2017. Each of the above applications is hereby expressly incorporated by reference, in its entirety, into the present application.

BACKGROUND OF THE INVENTION

1. Field of the Invention

The present invention relates to an image processing system, a server apparatus, an image processing method, and an image processing program and particularly, to image processing.

2. Description of the Related Art

A technology for imaging a subject and detecting a detection target of the subject from a captured image is known. In addition, a technology for dividing and imaging a subject and generating a composite image representing the whole subject by compositing divided images is known. An example of the subject is exemplified by a wall of a building. An example of the detection target is exemplified by damage on the wall of the building. An example of the damage is exemplified by a crevice, a hole, and the like.

In the detection of the damage such as a crevice, in a case where the image quality of a part of the input captured image is low, the damage may not be detected in the part of the low image quality. Even in a case where the damage is detected, detection accuracy may be decreased. An example of the case of low image quality is exemplified by out-of-focus, extreme brightness, extreme darkness, broken gradation, and the like.

In a case where the composite image is generated by compositing the divided images, in the composition of the divided images representing the detection results of the damage, the composite image may be generated by employing one of two detection results having low image quality in a superimposed region of the composite image in which two divided images are superimposed. Then, since the damage is detected in the detection result having high image quality, the damage may not be detected in the composite image.

In addition, in a case where a region having low image quality is present in the superimposed region of the composite image in which two divided images are superimposed, the image quality of the composite image is also degraded in a case where a pixel in the region having low image quality is used in an image composition process.

A technology disclosed in JP2004-072533A is known for an object of imaging that includes the whole subject without a region having low image quality in the composite image.

JP2004-072533A discloses an image input apparatus that divides and images a subject by allowing overlap, compares in-focus states of a plurality of divided images in an overlapping part, and performs an image composition process using a divided image that is determined as having the most favorable in-focus state.

In addition, in the comparison of the in-focus states, a pixel value is transformed into a frequency domain using fast Fourier transformation, discrete cosine transformation, and the like, and the amount of blurriness is quantitatively compared based on the magnitude relationship between peak frequencies in the frequency domain.

SUMMARY OF THE INVENTION

A case where a decrease in image quality occurs due to a plurality of causes may be present. However, in the invention disclosed in JP2004-072533A, a decrease in image quality caused by a plurality of causes is not considered in the determination of the quality of the in-focus state.

The present invention is conceived in view of such matters. An object of the present invention is to provide an image processing system, a server apparatus, an image processing method, and an image processing program enabling decision of an image processing target region considering a decrease in image quality caused by a plurality of causes.

In order to achieve the object, the following aspects of the invention are provided.

An image processing system according to a first aspect is an image processing system that executes at least one of a detection process of detecting a detection target included in an image or a composition process of calculating a correspondence relationship between a plurality of images and compositing the plurality of images based on the correspondence relationship. The system comprises an image acquisition unit that acquires an image obtained by capturing a subject, an image quality determination information acquisition unit that acquires image quality determination information representing a determination result of an image quality in the image acquired using the image acquisition unit, an image processing target region decision unit that decides an image processing target region in the image acquired using the image acquisition unit, by using the image quality determination information acquired using the image quality determination information acquisition unit, and an image processing unit that executes at least one of the detection process or the composition process for the image processing target region decided using the image processing target region decision unit, in which the image processing target region decision unit derives two or more temporary image processing target regions respectively corresponding to two or more pieces of the image quality determination information and decides a region represented as a logical product of the two or more temporary image processing target regions as the image processing target region.

According to the first aspect, the region represented as the logical product of the two or more temporary image processing target regions generated respectively based on the two or more pieces of the image quality determination information is decided as the image processing target region. Accordingly, the image processing target region in which a plurality of causes of decrease in image quality are considered can be decided.

One example of the determination result of the image quality is exemplified by information for distinguishing a region that is in focus from a region that is not in focus in an image of a determination target.

The logical product of the two or more temporary image processing target regions includes a second temporary image processing target region in a case where a first temporary image processing target region is decided based on a first condition and the second temporary image processing target region is decided based on a second condition using the first temporary image processing target region as a target.

A second aspect may be configured such that in the image processing system of the first aspect, the image quality determination information acquisition unit includes at least one of an imaging condition acquisition unit that acquires an imaging condition in the capturing of the image, or an analysis unit that analyzes the image, and the image processing target region decision unit decides the temporary image processing target region using at least one of the imaging condition of the image or an analysis result of the analysis unit.

According to the second aspect, the temporary image processing target region can be decided using at least one of the analysis result of the image or the imaging condition.

The two temporary image processing target regions may include the first temporary image processing target region that is derived using the imaging condition, and the second temporary image processing target region that is derived using the analysis result of the image quality. The two temporary image processing target regions may be derived using two analysis results or may be derived using two imaging conditions.

A third aspect may be configured such that in the image processing system of the second aspect, the imaging condition acquisition unit acquires an imaging angle and a focus position as the imaging condition, and the image processing target region decision unit decides a non-end portion of the image that is determined based on the imaging angle and the focus position as the temporary image processing target region.

According to the third aspect, the temporary image processing target region may be decided using the imaging angle and the focus position.

The imaging angle represents the direction of the optical axis of an imaging apparatus with respect to a reference direction in which the subject and the imaging apparatus are connected at the shortest distance. In a case where a tilt operation of the imaging apparatus is performed, the imaging angle is an angle directed upward or downward with respect to the reference direction. In a case where a pan operation of the imaging apparatus is performed, the imaging angle is an angle directed leftward or rightward with respect to the reference direction.

A fourth aspect may be configured such that in the image processing system of the second aspect, the imaging condition acquisition unit acquires an imaging angle, a focus position, a subject distance, a focal length, an F number, and a diameter of a permissible circle of confusion as the imaging condition, and the image processing target region decision unit decides a non-end portion of the image that is determined based on the imaging angle, the focus position, the subject distance, the focal length, the F number, and the diameter of the permissible circle of confusion as the temporary image processing target region.

According to the fourth aspect, the temporary image processing target region can be decided using the imaging angle, the focus position, the subject distance, the focal length, the F number, and the diameter of the permissible circle of confusion.

A fifth aspect may be configured such that the image processing system of the fourth aspect further comprises a depth of field calculation unit that calculates a depth of field in an imaging range using the subject distance, the focal length, the F number, and the diameter of the permissible circle of confusion, and a focal point shift amount calculation unit that calculates a focal point shift amount representing a distance of a focal point shift in the imaging range using the imaging angle and the focal length, in which the image processing target region decision unit decides a region in which the focal point shift amount calculated using the focal point shift amount calculation unit falls in a range of the depth of field calculated using the depth of field calculation unit as the temporary image processing target region.

According to the fifth aspect, the region in which the focal point shift amount falls in the range of the depth of field may be decided as the temporary image processing target region.

A sixth aspect may be configured such that in the image processing system of the second aspect, the imaging condition acquisition unit acquires a type of lens and a focus position as the imaging condition, and based on the type of lens and the focus position, in a case where the focus position is in a center portion of an imaging range, the image processing target region decision unit decides a region that includes the center portion and is determined from characteristics of the lens as the temporary image processing target region, and in a case where the focus position is in a peripheral portion of the imaging range, the image processing target region decision unit decides a region that includes the peripheral portion and is determined from the characteristics of the lens as the temporary image processing target region.

According to the sixth aspect, in a case where a field curvature caused by the characteristics of the lens occurs, the temporary image processing target region may be decided based on the focus position.

A storage unit that stores a relationship between the focus position and an in-focus region for each type of lens may be comprised. The image processing target region decision unit may read out the in-focus region from the storage unit using the type of lens and the focus position.

A seventh aspect may be configured such that in the image processing system of any one of the second to sixth aspects, the imaging condition acquisition unit acquires presence or absence of light emission of a strobe as the imaging condition, and the image processing target region decision unit decides a strobe light reaching region in which strobe light radiated to the subject from the strobe reaches as the temporary image processing target region.

According to the seventh aspect, the strobe light reaching region in which the strobe light reaches may be decided as the temporary image processing target region.

An eighth aspect may be configured such that in the image processing system of the seventh aspect, the imaging condition acquisition unit acquires a subject distance as the imaging condition, and the image processing target region decision unit decides the strobe light reaching region that is determined depending on the subject distance as the temporary image processing target region.

According to the eighth aspect, the strobe light reaching region that is determined based on the subject distance may be decided as the temporary image processing target region.

A storage unit that stores a relationship between the subject distance and the strobe light reaching region may be comprised. The image processing target region decision unit may read out the strobe light reaching region from the storage unit using the subject distance.

A ninth aspect may be configured such that in the image processing system of any one of the second to eighth aspects, the analysis unit divides an image of an analysis target into a plurality of regions and generates a spatial frequency spectrum distribution of each region, and the image processing target region decision unit decides a high image quality region that is determined based on the spatial frequency spectrum distribution of each region generated using the analysis unit as the temporary image processing target region.

According to the ninth aspect, the high image quality region that is determined based on the spatial frequency spectrum distribution of each region may be decided as the temporary image processing target region.

A tenth aspect may be configured such that in the image processing system of any one of the second to ninth aspects, the analysis unit divides an image of an analysis target into a plurality of regions and generates a histogram of a gradation value of each region, and the image processing target region decision unit decides a high image quality region that is determined based on the histogram of the gradation value of each region generated using the analysis unit as the temporary image processing target region.

According to the tenth aspect, the high image quality region that is determined based on the histogram of the gradation value of each region may be decided as the temporary image processing target region.

An eleventh aspect may be configured such that the image processing system of any one of the first to tenth aspects further comprises a storage unit that stores a relationship between the image quality determination information acquired using the image quality determination information acquisition unit and the temporary image processing target region in association, in which the image processing target region decision unit acquires the temporary image processing target region corresponding to the image quality determination information from the storage unit using the image quality determination information acquired using the image quality determination information acquisition unit.

According to the eleventh aspect, the temporary image processing target region corresponding to the image quality determination information may be acquired from the storage unit using the image quality determination information.

A twelfth aspect may be configured such that the image processing system of any one of the first to eleventh aspects further comprises an image display unit that displays an image on which image processing is performed using the image processing unit, in which the image display unit displays an image processing target exclusion region that is excluded from a target of the image processing using the image processing unit.

According to the twelfth aspect, the image processing target region and the image processing target exclusion region may be perceived.

A thirteenth aspect may be configured such that the image processing system of any one of the first to twelfth aspects further comprises an image processing target region changing unit that changes the image processing target region decided using the image processing target region decision unit.

According to the thirteenth aspect, the image processing target region that is decided in advance can be changed. Accordingly, the image processing target region can be decided again.

A fourteenth aspect may be configured such that in the image processing system of any one of the first to thirteenth aspects, the image processing unit executes a process of detecting at least one of a crevice of a concrete member, a chalk line, free lime, water leakage, stripping, rebar exposure, a float, a crack of a steel member, or corrosion as the detection target.

According to the fourteenth aspect, at least one of the crevice of the concrete member, the chalk line, the free lime, the water leakage, the stripping, the rebar exposure, the float, the crack of the steel member, or the corrosion can be detected using the image obtained by capturing the subject.

A fifteenth aspect may be configured such that the image processing system of any one of the first to fourteenth aspects further comprises a server apparatus, and a client apparatus that is communicably connected to the server apparatus through a network, in which the server apparatus includes the image acquisition unit, the image quality determination information acquisition unit, the image processing target region decision unit, and the image processing unit.

According to the fifteenth aspect, the same effect as the first aspect can be obtained using the server apparatus in a client server type network system.

A sixteenth aspect may be configured such that in the image processing system of the fifteenth aspect, the client apparatus includes an image data transmission unit that transmits image data representing the image to the server apparatus.

According to the sixteenth aspect, the image data may be transmitted to the server apparatus using the client apparatus in the client server type network system.

A server apparatus according to a seventeenth aspect is a server apparatus included in an image processing system that executes at least one of a detection process of detecting a detection target included in an image or a composition process of calculating a correspondence relationship between a plurality of images and compositing the plurality of images based on the correspondence relationship. The apparatus comprises an image acquisition unit that acquires an image obtained by capturing a subject, an image quality determination information acquisition unit that acquires image quality determination information representing a determination result of an image quality in the image acquired using the image acquisition unit, an image processing target region decision unit that decides an image processing target region in the image acquired using the image acquisition unit, by using the image quality determination information acquired using the image quality determination information acquisition unit, and an image processing unit that executes at least one of the detection process or the composition process for the image processing target region decided using the image processing target region decision unit, in which the image processing target region decision unit derives two or more temporary image processing target regions respectively corresponding to two or more pieces of the image quality determination information and decides a region represented as a logical product of the two or more temporary image processing target regions as the image processing target region.

According to the seventeenth aspect, the same effect as the first aspect can be obtained.

In the seventeenth aspect, the same matters as the matters specified in the second aspect to the sixteenth aspect can be appropriately combined. In this case, a constituent performing a process or a function specified in the image processing system can be perceived as a constituent of the server apparatus performing the corresponding process or function.

An image processing method according to an eighteenth aspect is an image processing method of executing at least one of a detection process of detecting a detection target included in an image or a composition process of calculating a correspondence relationship between a plurality of images and compositing the plurality of images based on the correspondence relationship. The method comprises an image acquisition step of acquiring an image obtained by capturing a subject, an image quality determination information acquisition step of acquiring image quality determination information representing a determination result of an image quality in the image acquired in the image acquisition step, an image processing target region decision step of deciding an image processing target region in the image acquired in the image acquisition step, by using the image quality determination information acquired in the image quality determination information acquisition step, and an image processing step of executing at least one of the detection process or the composition process for the image processing target region decided in the image processing target region decision step, in which in the image processing target region decision step, two or more temporary image processing target regions respectively corresponding to two or more pieces of the image quality determination information are derived, and a region represented as a logical product of the two or more temporary image processing target regions is decided as the image processing target region.

According to the eighteenth aspect, the same effect as the first aspect can be obtained.

In the eighteenth aspect, the same matters as the matters specified in the second aspect to the sixteenth aspect can be appropriately combined. In this case, a constituent performing a process or a function specified in the image processing system can be perceived as a constituent of the image processing method for performing the corresponding process or function.

A nineteenth aspect may be configured such that in the image processing method of the eighteenth aspect, the image quality determination information acquisition step includes an imaging condition acquisition step of acquiring an imaging condition in the capturing of the image and an analysis step of analyzing the image, and in the image processing target region decision step, the image processing target region is decided by executing an analysis process in the analysis step for the temporary image processing target region that is decided using the image quality determination information based on the imaging condition acquired in the imaging condition acquisition step.

According to the nineteenth aspect, a target of the analysis process may be limited to the temporary image processing target region that is based on the image quality determination information. Accordingly, a load of the analysis process can be reduced.

An example of the reduction of the load of the analysis process is exemplified by an increase in speed of the analysis process and simplification of a configuration of an analysis processing unit that performs the analysis step.

An image processing program according to a twentieth aspect is an image processing program for executing at least one of a detection process of detecting a detection target included in an image or a composition process of calculating a correspondence relationship between a plurality of images and compositing the plurality of images based on the correspondence relationship. The program causes a computer to implement an image acquisition function of acquiring an image obtained by capturing a subject, an image quality determination information acquisition function of acquiring image quality determination information representing a determination result of an image quality in the image acquired using the image acquisition function, an image processing target region decision function of deciding an image processing target region in the image acquired using the image acquisition function, by using the image quality determination information acquired using the image quality determination information acquisition function, and an image processing function of executing at least one of the detection process or the composition process for the image processing target region decided using the image processing target region decision function, in which the image processing target region decision function derives two or more temporary image processing target regions respectively corresponding to two or more pieces of the image quality determination information and decides a region represented as a logical product of the two or more temporary image processing target regions as the image processing target region.

In the twentieth aspect, the same matters as the matters specified in the second aspect to the eighth aspect can be appropriately combined. In this case, a constituent performing a process or a function specified in the image processing system can be perceived as a constituent of the image processing program for performing the corresponding process or function.

The twentieth aspect may be configured as an image processing apparatus that includes at least one processor and at least one memory. The processor acquires an image obtained by capturing a subject, acquires image quality determination information representing a determination result of an image quality in the acquired image, decides an image processing target region in the image using the image quality determination information, and executes at least one of a detection process or a composition process for the image processing target region, in which in the decision of the image processing target region, two or more temporary image processing target regions respectively corresponding to two or more pieces of the image quality determination information are derived, and a region represented as a logical product of the two or more temporary image processing target regions respectively corresponding to the two or more pieces of the image quality determination information is decided as the image processing target region.

The memory may store the acquired image, the image quality determination information, the temporary image processing target region, the image processing target region, and at least one of process results obtained by executing at least one of the detection process or the composition process.

According to the present invention, the region represented as the logical product of the two or more temporary image processing target regions generated respectively based on the two or more pieces of the image quality determination information is decided as the image processing target region. Accordingly, the image processing target region in which a plurality of causes of decrease in image quality are considered can be decided.

BRIEF DESCRIPTION OF THE DRAWINGS

FIG. 12 is a diagram illustrating one example of a temporary image processing target region in a case where a focus area is the center of an imaging range.

FIG. 13 is a diagram illustrating one example of the temporary image processing target region in a case where the focus area is positioned below the center of the imaging range.

DESCRIPTION OF THE PREFERRED EMBODIMENTS

Hereinafter, a preferred embodiment of the present invention will be described in accordance with the appended drawings. In the present specification, the same constituents will be designated by the same reference signs, and descriptions of such constituents will not be repeated.

[Summary of Image Processing System]

Figure 1:
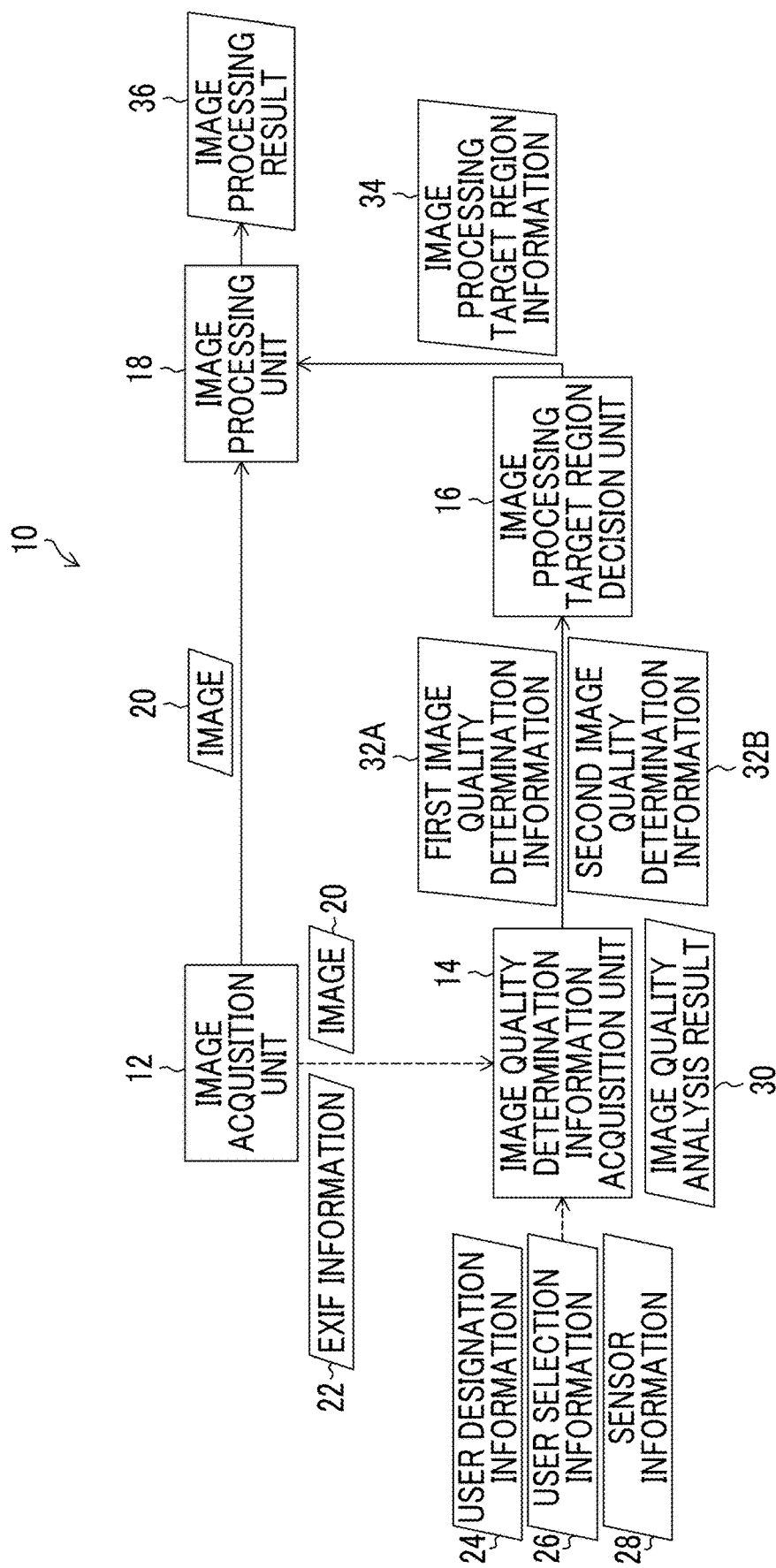
FIG. 1 is a block diagram of an image processing system according to an embodiment.

FIG. 1 is a block diagram of an image processing system according to the embodiment. An image processing system 10 illustrated in FIG. 1 comprises an image acquisition unit 12, an image quality determination information acquisition unit 14, an image processing target region decision unit 16, and an image processing unit 18. The image processing system 10 may comprise an image display unit, not illustrated.

<Image Acquisition Unit>

The image acquisition unit 12 acquires image data as a target of image processing that uses the image processing unit 18. An example of the image data is exemplified by image data that is obtained by imaging a subject using an imaging apparatus. An example of the imaging apparatus is exemplified by an electronic camera that can capture a color image. The concept of imaging in the present specification includes filming.

An example of an image pick-up device comprised in the electronic camera is exemplified by a color CCD linear image sensor. CCD is the abbreviation for Charge-Coupled Device and refers to a charge-coupled element.

The color CCD linear image sensor is an image sensor in which a light-receiving element comprising a color filter of each color of R, G, and B is linearly arranged. R denotes red. G denotes green. B denotes blue.

Instead of the color CCD linear image sensor, a color CMOS linear image sensor can be used. CMOS is the abbreviation for Complementary Metal Oxide Semiconductor and refers to a complementary metal oxide film semiconductor.

<Image Quality Determination Information Acquisition Unit>

The image quality determination information acquisition unit 14 acquires image data 20 that is acquired using the image acquisition unit 12. The image quality determination information acquisition unit 14 may acquire EXIF information 22 of the image data 20 illustrated in FIG. 1 as information of an imaging condition. EXIF is the abbreviation for Exchangeable Image File Format.

As the imaging condition, the image quality determination information acquisition unit 14 may acquire at least one of user designation information 24 designated by a user, user selection information 26 selected by the user, and sensor information 28 acquired from a sensor.

That is, the image processing system 10 may comprise an EXIF information acquisition unit that acquires the EXIF information 22. The image processing system 10 may comprise a user designation information acquisition unit that acquires the user designation information 24. The image processing system 10 may comprise a user selection information acquisition unit that acquires the user selection information 26. The image processing system 10 may comprise a sensor information acquisition unit that acquires the sensor information 28.

The image processing system 10 may comprise an imaging condition acquisition unit that functions as at least one of the EXIF information acquisition unit, the user designation information acquisition unit, the user selection information acquisition unit, and the sensor information acquisition unit. Illustrations of the EXIF information acquisition unit, the user designation information acquisition unit, the user selection information acquisition unit, and the sensor information acquisition unit are not provided. The imaging condition acquisition unit is designated by reference sign 40 and illustrated in FIG. 3.

The image quality determination information acquisition unit 14 performs an image quality analysis process on the acquired image data 20 and acquires an image quality analysis result 30. Alternatively, the image quality determination information acquisition unit 14 acquires the imaging condition. The image quality determination information acquisition unit 14 may acquire both of the image quality analysis result 30 and the imaging condition.

The image quality determination information acquisition unit 14 determines the image quality of an image represented by the image data 20 using at least one of the image quality analysis result 30 and the imaging condition. The image quality analysis result 30 is one example of an analysis result of analysis of an image using an analysis unit.

The image quality determination information acquisition unit 14 generates two different types of image quality determination information including first image quality determination information 32A and second image quality determination information 32B as a determination result of the image quality of the image represented by the image data 20. The two different types of image quality determination information may be read as two different pieces of image quality determination information.

The first image quality determination information 32A and the second image quality determination information 32B may be generated using two different types of image quality analysis results 30. The first image quality determination information 32A and the second image quality determination information 32B may be generated using two different types of imaging conditions. The two different types of imaging conditions may be read as two different imaging conditions.

The first image quality determination information 32A may be generated using the image quality analysis result 30, and the second image quality determination information 32B may be generated using the imaging condition. The first image quality determination information 32A may be generated using the imaging condition, and the second image quality determination information 32B may be generated using the image quality analysis result 30.

In the present embodiment, an aspect in which two types of image quality determination information are generated is illustrated. Alternatively, two or more types of image quality determination information may be generated, or three or more types of image quality determination information may be generated. Details of the image quality determination using the image quality determination information acquisition unit 14 will be described below.

<Image Processing Target Region Decision Unit>

The image processing target region decision unit 16 decides an image processing target region in the image data 20 based on the first image quality determination information 32A and the second image quality determination information 32B. The image processing target region decision unit 16 decides a first temporary image processing target region based on the first image quality determination information 32A. In addition, the image processing target region decision unit 16 decides a second temporary image processing target region based on the second image quality determination information 32B. That is, the image processing target region decision unit 16 derives two or more temporary image processing target regions corresponding to the two types of image quality determination information.

The two or more different temporary image processing target regions are exemplified by a region excluding an out-of-focus region caused by an imaging angle, a region excluding an out-of-focus region caused by the characteristics of the lens, a region excluding a region that becomes dark due to strobe light emission, a region excluding an excessively bright region, a region excluding an excessively dark region, and a region excluding a region having broken gradation.

The image processing target region decision unit 16 combines the two or more temporary image processing target regions. An example of the combining is exemplified by an example in which a region represented as the logical product of the two or more temporary image processing target regions is decided as the image processing target region. The image processing target region decision unit 16 generates image processing target region information 34 that represents the image processing target region.

<Image Processing Unit>

The image processing unit 18 acquires the image data 20 and the image processing target region information 34. The image processing unit 18 performs image processing on the image processing target region in the image data 20 and generates an image processing result 36.

An example of the image processing using the image processing unit 18 is exemplified by a detection process of detecting a detection target included in the image represented by the image data 20. Another example of the image processing using the image processing unit 18 is exemplified by a composition process of compositing divided images obtained by dividing and imaging a subject.

<Specific Example of Image Processing>

Figure 2:
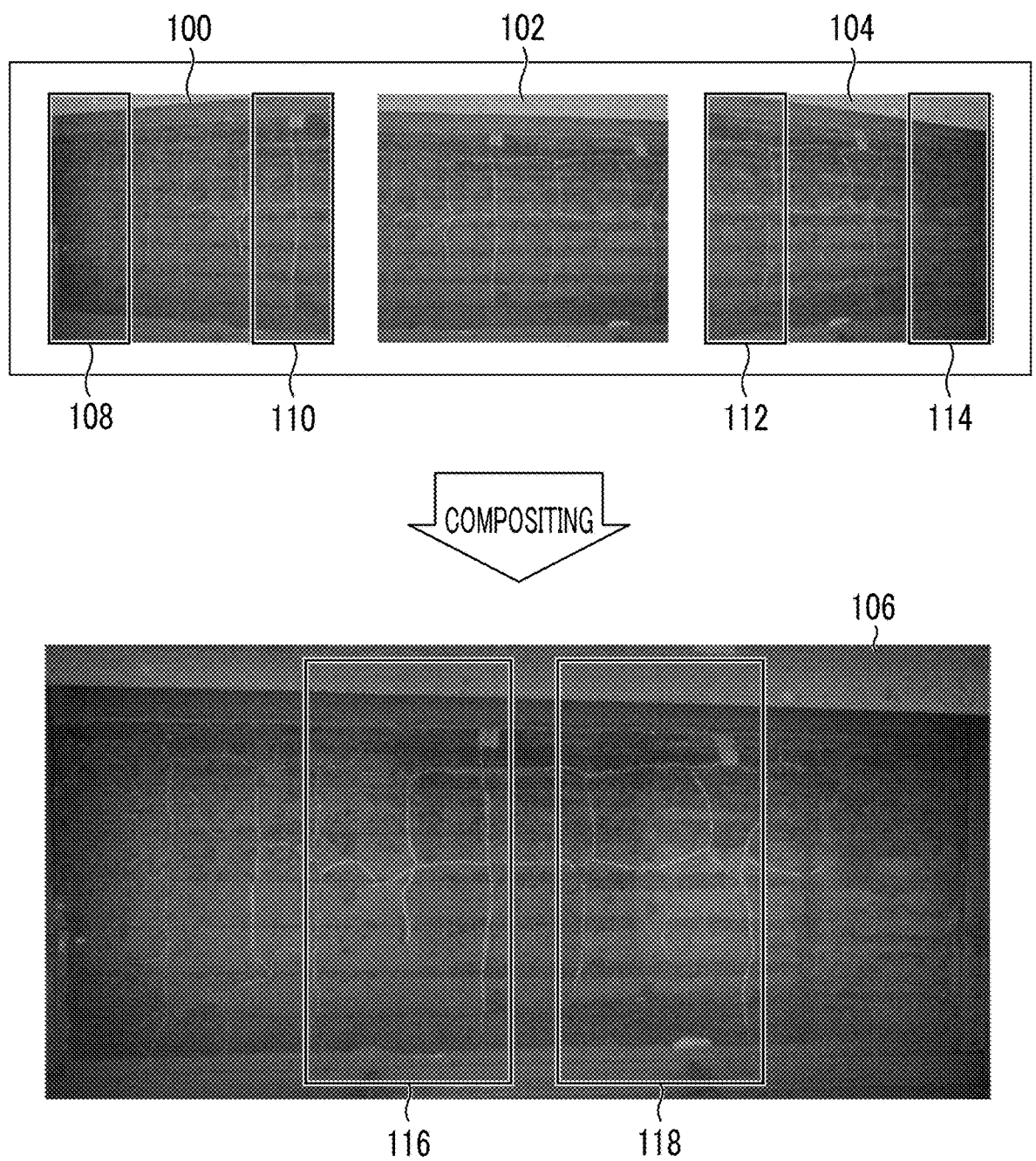
FIG. 2 is a descriptive diagram of a specific example of image processing.

FIG. 2 is a descriptive diagram of a specific example of the image processing. The image processing illustrated in FIG. 2 is the composition process of compositing three divided images including a divided image 100, a divided image 102, and a divided image 104 that are obtained by dividing a concrete wall of a building into three parts and imaging the divided parts.

The divided image 100, the divided image 102, and the divided image 104 illustrated in FIG. 2 are images obtained by arranging the imaging apparatus on a line that is normal to the wall as a subject and passes through the center of the wall, performing a pan operation of the imaging apparatus, and imaging the wall by changing an imaging region on the wall. The center of the wall may not be an exact center position and may be an approximate center position.

Regions that are designated by reference sign 108 and reference sign 110 and illustrated in the divided image 100 are out-of-focus regions. Regions that are designated by reference sign 112 and reference sign 114 and illustrated in the divided image 104 are out-of-focus regions. The out-of-focus region is a region that is out of focus. A region excluding the out-of-focus region is an in-focus region that is in focus.

In the divided image 100, the out-of-focus region 108 and the out-of-focus region 110 are present in both end portions of the divided image 100 in the lateral direction. In the divided image 104, the out-of-focus region 112 and the out-of-focus region 114 are present in both end portions of the divided image 104 in the lateral direction.

In other words, the in-focus region is present in the non-end portion of the divided image 100 in the lateral direction and the non-end portion of the divided image 104 in the lateral direction. The non-end portion is a region excluding both end portions. For the up-down direction, a region excluding both end portions in the up-down direction is a non-end portion in the up-down direction.

Meanwhile, the out-of-focus region is not present in the divided image 102. In other words, the in-focus region is present across the whole range of the divided image 102 in the lateral direction.

The lateral direction of the divided image is a direction in which the optical axis of the imaging apparatus in the subject moves in the pan operation of the imaging apparatus. The longitudinal direction of the divided image is a direction in which the optical axis of the imaging apparatus in the subject moves in a tilt operation of the imaging apparatus. The optical axis of the imaging apparatus represents the optical axis of an optical image formation system comprised in the imaging apparatus.

An overlapping region is present in the divided image 100 and the divided image 102. An overlapping region is present in the divided image 102 and the divided image 104. A composite image 106 illustrated in FIG. 2 is a composite image that is generated by performing the composition process of compositing the divided image 100, the divided image 102, and the divided image 104.

In the composite image 106, a region designated by reference sign 116 is a superimposed region between the divided image 100 and the divided image 102. In the composite image 106, a region designated by reference sign 118 is a superimposed region between the divided image 102 and the divided image 104.

In a case where the pixels of the out-of-focus region 110 of the divided image 100 are included in the superimposed region 116 of the composite image 106, the superimposed region 116 in the composite image 106 is blurred due to the pixels of the out-of-focus region 110 of the divided image 100.

Similarly, in a case where the pixels of the out-of-focus region 112 of the divided image 104 are included in the superimposed region 118 of the composite image 106, the superimposed region 118 in the composite image 106 is blurred due to the pixels of the out-of-focus region 112 of the divided image 104.

The image processing system according to the present embodiment uses the pixels of the divided image 102 which is not out of focus for the superimposed region 116 of the composite image 106. In addition, the image processing system uses the pixels of the divided image 102 which is not out of focus for the superimposed region 118 of the composite image 106. Accordingly, the occurrence of blurriness in the superimposed region 116 and the superimposed region 118 of the composite image 106 may be avoided.

[Description of Decision of Image Processing Target Region Using Imaging Condition]

Figure 3:
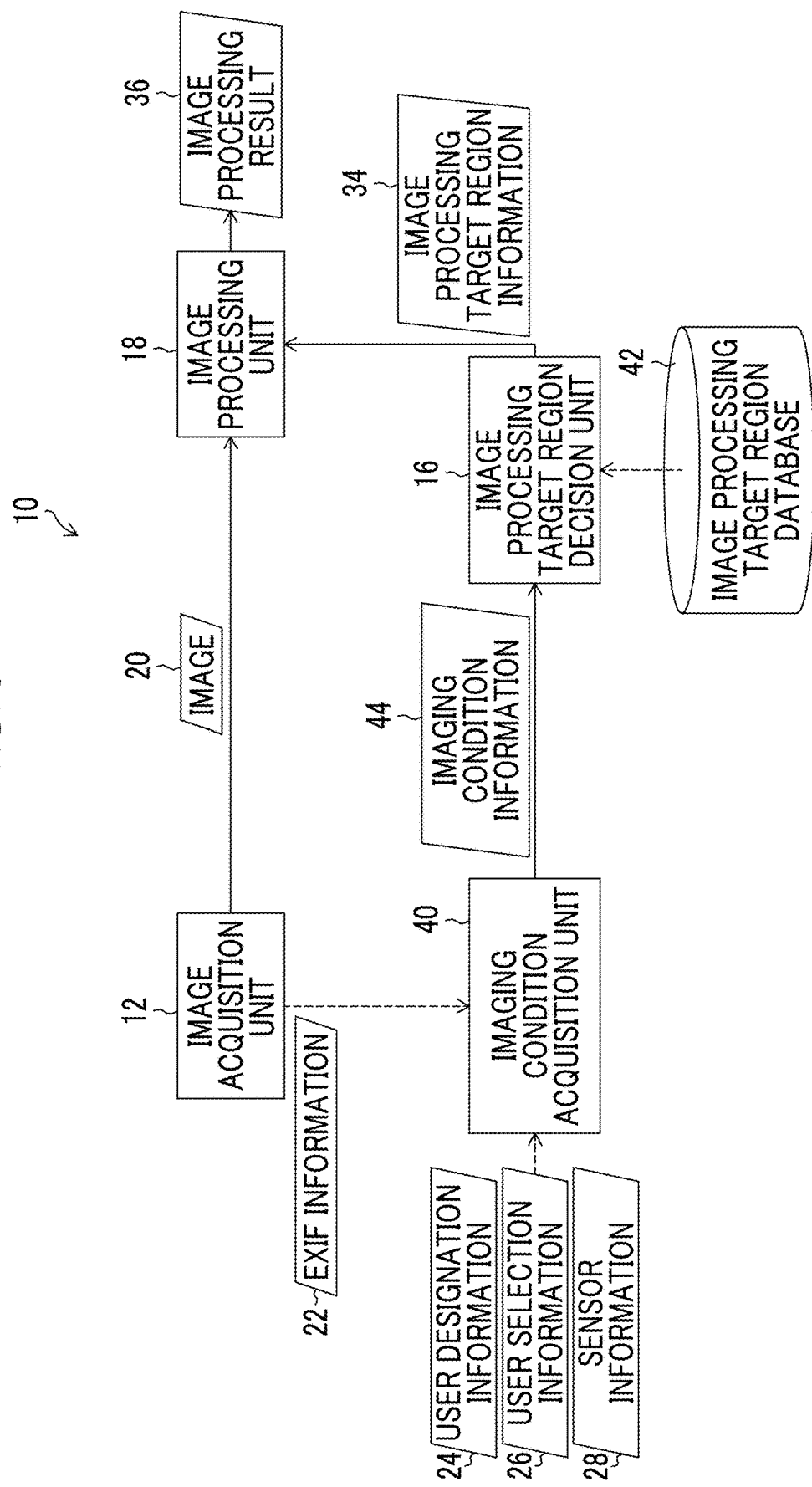
FIG. 3 is a block diagram of a case where an image processing target region is decided using an imaging condition in the image processing system illustrated in FIG. 1.

FIG. 3 is a block diagram of a case where the image processing target region is decided using the imaging condition in the image processing system illustrated in FIG. 1. The image processing system 10 illustrated in FIG. 3 comprises an imaging condition acquisition unit 40 as the image quality determination information acquisition unit 14 illustrated in FIG. 1. In addition, the image processing system 10 illustrated in FIG. 3 comprises an image processing target region database 42.

The imaging condition acquisition unit 40 may acquire at least one condition of the imaging angle, a subject distance, a focal length, an F number, a permissible circle of confusion diameter, the type of lens, the type of camera, a focus position, the presence or absence of strobe light emission, and the like as the imaging condition.

The imaging condition acquisition unit 40 may acquire the imaging condition included in the EXIF information 22 transmitted from the image acquisition unit 12 as the imaging condition. The imaging condition acquisition unit 40 may acquire the imaging condition designated by the user, the imaging condition selected by the user, and the imaging condition obtained using the sensor as the imaging condition. The imaging condition acquisition unit 40 may acquire the imaging condition linked to the model of the camera.

The imaging condition acquisition unit 40 transmits imaging condition information 44 representing the imaging condition to the image processing target region decision unit 16. The imaging condition information 44 is one example of the first image quality determination information 32A or the second image quality determination information 32B illustrated in FIG. 1.

In the image processing target region database 42, the relationship between the imaging condition and the temporary image processing target region is stored as a database. Based on the imaging condition as an index, the image processing target region decision unit 16 can acquire the temporary image processing target region corresponding to the imaging condition using the image processing target region database 42.

By using the temporary image processing target region which is acquired from the image processing target region database 42 and corresponds to the imaging condition, the image processing target region decision unit 16 decides the image processing target region as a target of the image processing using the image processing unit 18. The image processing target region database 42 is one example of a storage unit in which the relationship between the image quality determination information and the temporary image processing target region is stored in association with each other.

That is, the image processing target region decision unit 16 decides one or more temporary image processing target regions using the imaging condition.

The image processing target region decision unit 16 may decide the image processing target region as a region represented by the logical product of the temporary image processing target region based on the imaging condition and the temporary image processing target region based on the image quality analysis result 30 illustrated in FIG. 1.

The image processing target region decision unit 16 may decide two or more different temporary image processing target regions using two or more different types of imaging conditions. The image processing target region decision unit 16 may decide the image processing target region as a region represented by the logical product of two or more different temporary image processing target regions.

The image processing target region decision unit 16 may decide an image processing target exclusion region. The image processing target exclusion region is a region that is excluded from the target of the image processing using the image processing unit 18. The same applies to the image processing unit 18 in the image processing system 10 illustrated in FIG. 4.

The image processing target region decision unit 16 transmits the image processing target region information 34 to the image processing unit 18. The image processing unit 18 executes the image processing based on the image data 20 and the image processing target region information 34 and outputs the image processing result 36.

[Specific Example of Imaging Condition]

A specific example of imaging information acquired using the imaging condition acquisition unit 40 illustrated in FIG. 3 will be described. A specific example of the imaging information designated by the user or the imaging information selected by the user is exemplified by the model of the camera, the type of lens, an imaging position condition, and the setting of the camera. The setting of the camera may be the setting of the lens.

The size of an imaging element for each camera may be perceived from the model of the camera. The size of the imaging element can be used for calculating the depth of field as the permissible circle of confusion diameter. In the case of a camera in which the lens is not replaceable, the characteristics of the lens for each camera may be perceived from the model of the camera. The characteristics of the lens can be used for determining the presence or absence of the field curvature.

In the image processing target region database 42 illustrated in FIG. 3, the relationship between the model of the camera and the size of the imaging element may be stored as a database. In the image processing target region database 42 illustrated in FIG. 3, the relationship between the model of the camera and the characteristics of the lens may be stored as a database for the camera in which the lens is not replaceable.

The user may designate or select the size of the imaging element. The user may designate or select the characteristics of the lens.

In the case of the camera in which the lens is not replaceable, the type of lens may be acquired as the imaging condition. The characteristics of the lens may be perceived from the type of lens. The characteristics of the lens can be used for determining the presence or absence of the field curvature.

In the image processing target region database 42 illustrated in FIG. 3, the relationship between the type of lens and the characteristics of the lens may be stored as a database. The characteristics of the lens may be designated or selected.

At least one of the subject distance and the imaging angle may be perceived from the imaging position condition. Details of the subject distance and the imaging angle will be described below.

At least one of the focus position, the focal length, the F number, and the presence or absence of strobe light emission may be perceived from the setting of the camera or the setting of the lens.

A specific example of the imaging condition that may be acquired from metadata of the image is exemplified by the model of the camera, the type of lens, and the setting of the camera. The setting of the camera may be the setting of the lens. The metadata of the image is information that is not the image data and is related to the image data. An example of the metadata is exemplified by the EXIF information 22 illustrated in FIG. 1 and FIG. 3.

The model of the camera, the type of lens, and the setting of the camera or the setting of the lens are described above. Descriptions of details of the model of the camera, the type of lens, and the setting of the camera or the setting of the lens will not be repeated.

A specific example of the imaging condition that may be acquired using the sensor is exemplified by the imaging position and the imaging angle. The subject distance may be perceived from the imaging position condition. In the case of imaging using a robot, the imaging condition acquisition unit 40 illustrated in FIG. 3 may acquire information that is obtained from various sensors comprised in the robot. Examples of the various sensors are exemplified by a sensor measuring the subject distance, a sensor measuring the imaging angle, and the like. The subject distance is measured as a distance from the lens of the imaging apparatus to the subject. The subject distance may be measured by a filmer using a measurement assistance tool such as a measure. The subject distance may be measured using a measurer such as a laser measurer. The imaging angle may be measured using a measurer such as an angle meter. The imaging angle may be derived from the distance between the imaging apparatus and the subject in the horizontal direction and the distance between the imaging apparatus and the subject in the optical axis direction of the imaging apparatus using a trigonometric function.

[Description of Decision of Image Processing Target Region Using Image Quality Analysis Result]

Figure 4:
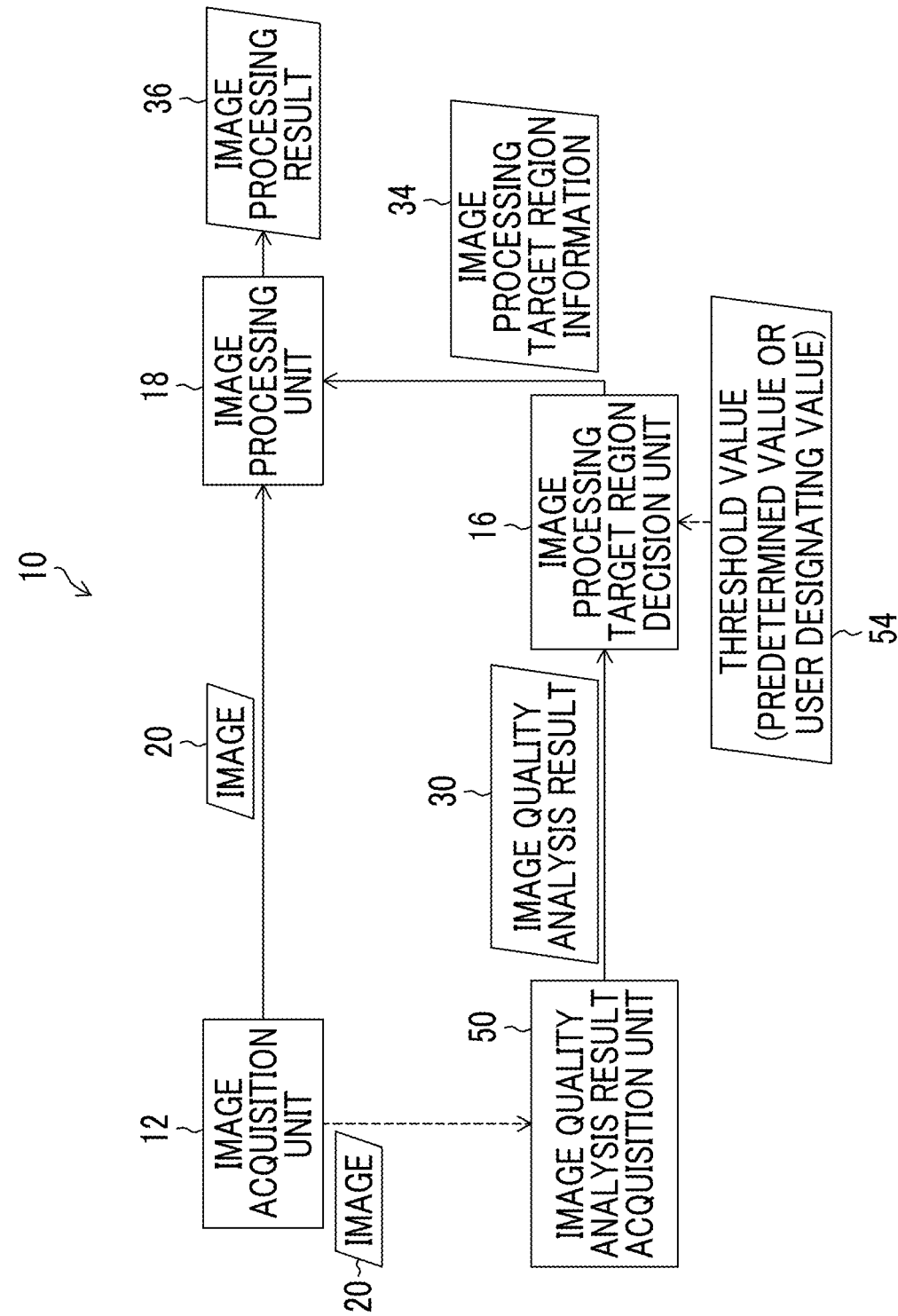
FIG. 4 is a block diagram of a case where the image processing target region is decided using an image quality analysis result in the image processing system illustrated in FIG. 1.

FIG. 4 is a block diagram of a case where the image processing target region is decided using the image quality analysis result in the image processing system illustrated in FIG. 1. The image processing system 10 illustrated in FIG. 4 comprises an image quality analysis result acquisition unit 50 as the image quality determination information acquisition unit 14 illustrated in FIG. 1. In addition, the image processing system 10 illustrated in FIG. 4 comprises a threshold value input unit that inputs a threshold value into the image processing target region decision unit 16. An illustration of the threshold value input unit is not provided.

The image quality analysis result acquisition unit 50 illustrated in FIG. 4 sets a plurality of analysis regions in the image data 20, executes the image quality analysis on each analysis region, and acquires the image quality analysis result 30. An example of the image quality analysis is exemplified by generation of a spectrum distribution of a spatial frequency and generation of a shade histogram that is a histogram of a shade value in a gray scale image. The image quality analysis result acquisition unit 50 is one example of an analysis unit.

Determination information for out-of-focus and shake may be acquired from the spectrum distribution of the spatial frequency in each analysis region. Determination information for an excessively dark region, an excessively bright region, and a region having broken gradation may be acquired from the shade histogram of each analysis region in the gray scale image. The image quality determination information acquisition unit 14 transmits the acquired image quality analysis result 30 to the image processing target region decision unit 16.

The image processing target region decision unit 16 decides one or more temporary image processing target regions by setting a threshold value 54 for the image quality analysis result 30. The threshold value 54 may be a predetermined value that is set in advance, or a designated value that is designated by the user.

The image processing target region decision unit 16 may decide the image processing target region as a region represented by the logical product of the temporary image processing target region decided using the image quality analysis result 30 and the temporary image processing target region decided using the imaging condition.

The image processing target region decision unit 16 may decide two or more different temporary image processing target regions using two or more different types of image quality analysis results. The image processing target region decision unit 16 may decide the image processing target region as a region represented by the logical product of two or more different temporary image processing target regions decided using two different types of image quality analysis results.

The image processing target region decision unit 16 transmits the image processing target region information 34 to the image processing unit 18. The image processing unit 18 executes the image processing based on the image data 20 and the image processing target region information 34 and outputs the image processing result 36.

Various processing units illustrated in FIG. 1 to FIG. 4 may be represented as processing units using English representation. A processor may be represented as a processor using English representation. The processing units include a substantial processing unit that is a constituent not having the name "processing unit" but executes any process.

Various processors include a CPU that is a general-purpose processor functioning as various processing units by executing a program, a PLD that is a processor such as an FPGA of which the circuit configuration can be changed after manufacturing, a dedicated electric circuit that is a processor such as an ASIC having a circuit configuration dedicatedly designed to execute a specific process, and the like. The program is the same definition as software.

FPGA is the abbreviation for Field Programmable Gate Array. PLD is the abbreviation for Programmable Logic Device. ASIC is the abbreviation for Application Specific Integrated Circuit.

One processing unit may be configured with one of the various processors or may be configured with two or more processors of the same type or different types. For example, one processing unit may be configured with a plurality of FPGAs or a combination of a CPU and an FPGA. In addition, a plurality of processing units may be configured with one processor.

As an example of configuring a plurality of processing units with one processor, a first form is configuring one processor with a combination of one or more CPUs and software and implementing a plurality of processing units by the processor as represented by a computer such as a client and a server.

A second form is using a processor that implements the function of the whole system including the plurality of processing units using one IC chip as represented by an SoC and the like. Various processing units are configured using one or more of the various processors as a hardware structure. Furthermore, the hardware structure of the various processors is more specifically an electric circuit in which circuit elements such as a semiconductor element are combined.

SoC is the abbreviation for System On Chip. IC is the abbreviation for Integrated Circuit. The electric circuit may be represented as circuitry using English representation.

[Detailed Description of Image Quality Analysis]

Next, the image quality analysis using the image quality analysis result acquisition unit 50 illustrated in FIG. 4 will be described in detail. Hereinafter, the image quality analysis in the divided image 100 illustrated in FIG. 2 will be described.

Figure 5:
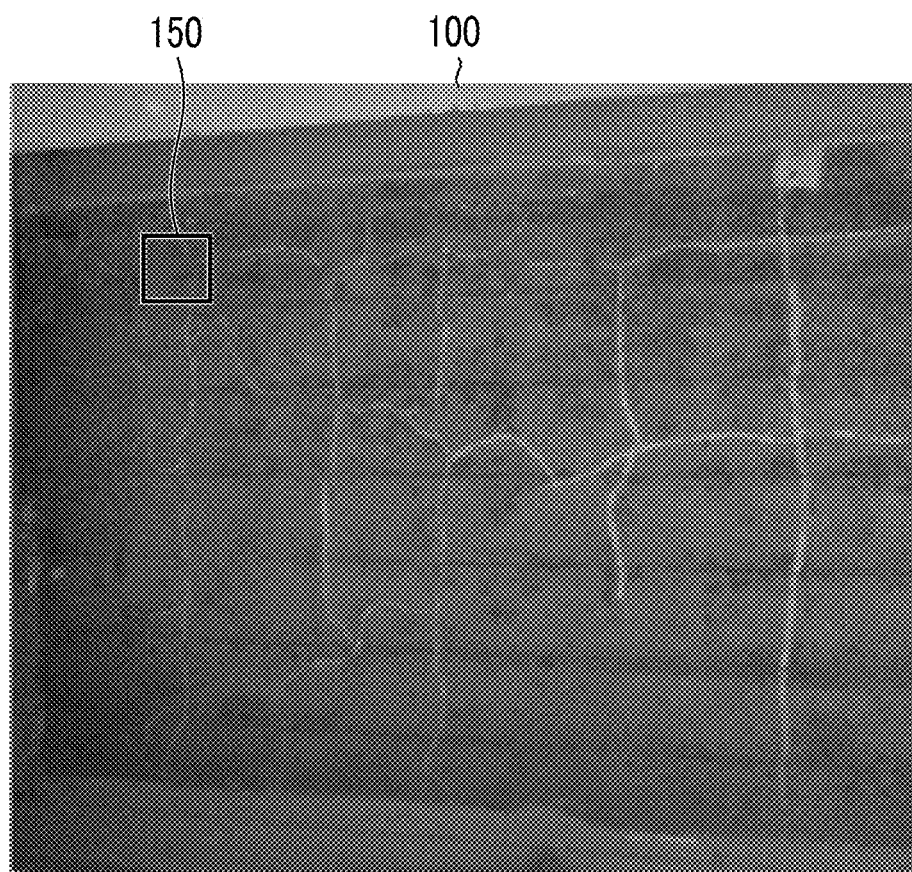
FIG. 5 is a diagram illustrating one example of an analysis region.

FIG. 5 is a diagram illustrating one example of the analysis region. An analysis region 150 illustrated in FIG. 5 is a region as the unit of the image quality analysis. The analysis region 150 represents any one of a plurality of analysis regions set in the divided image 100. Hereinafter, in a case where the term analysis region is used without a reference sign, the analysis region represents the analysis region illustrated in FIG. 5.

In the present embodiment, a plurality of analysis regions are set in the divided image 100 in each of the longitudinal direction and the transverse direction. The divided image may be divided in each of any two orthogonal directions.

While the analysis region 150 having a square shape is illustrated in the present embodiment, any shape such as a polygonal shape and a circle other than the square shape may be applied as the shape of the analysis region 150. Furthermore, the number of pixels of the analysis region 150 can be appropriately determined.

The image quality analysis result acquisition unit 50 illustrated in FIG. 4 acquires the result of the image quality analysis process in each analysis region of the plurality of analysis regions. The acquisition of the result of the image quality analysis process includes an aspect in which the result of the image quality analysis process performed using the image quality analysis result acquisition unit 50 is acquired.

<One Example of Image Quality Analysis Process>

Next, acquisition of a spatial frequency spectrum distribution in each analysis region will be described as one example of the image quality analysis process result. FFT is applied in the acquisition of the spatial frequency spectrum distribution. FFT is the abbreviation for fast Fourier transform that is an English representation representing a fast Fourier transformation process.

Figure 6:
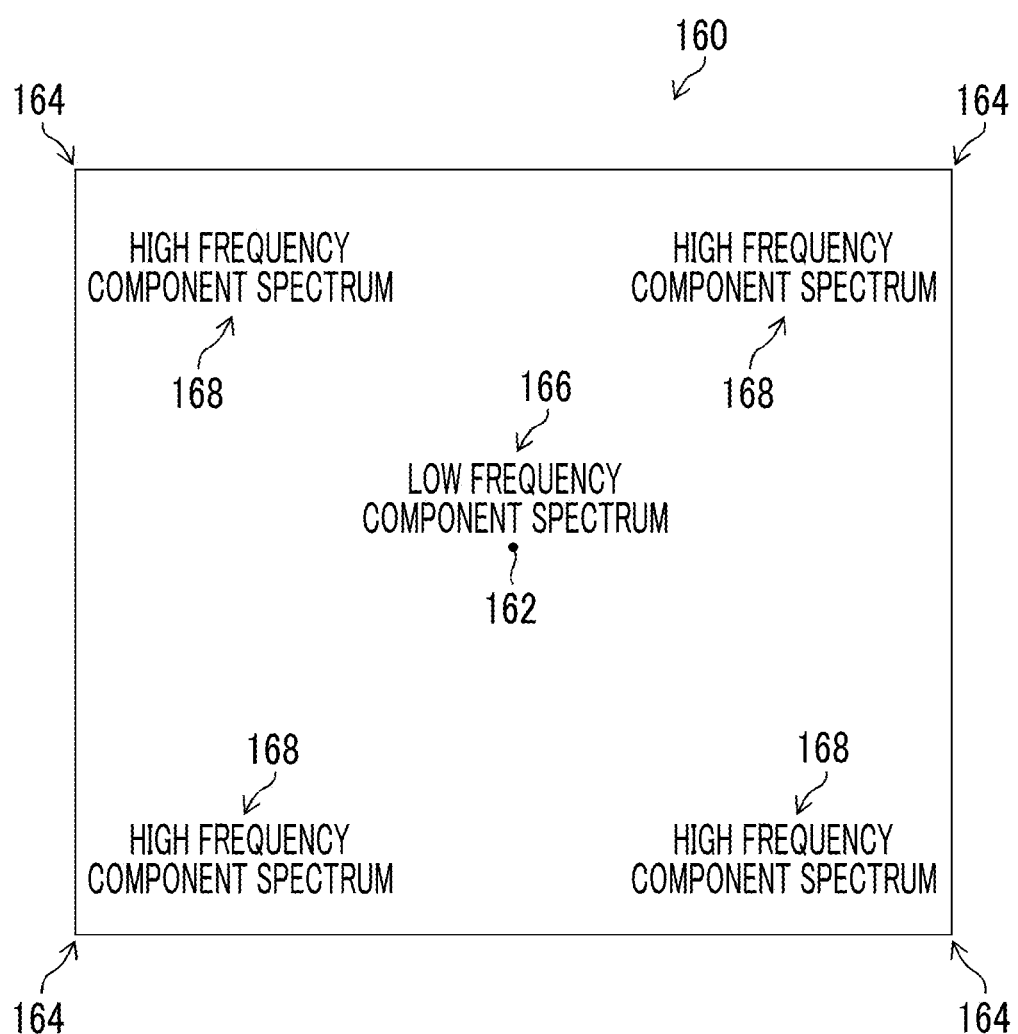
FIG. 6 is a schematic diagram of a spatial frequency spectrum distribution image in an in-focus region.

FIG. 6 is a schematic diagram of a spatial frequency spectrum distribution image in a case where the analysis region is the in-focus region. A center 162 of a spatial frequency spectrum distribution image 160 represents a spatial frequency of 0. A corner 164 of the spatial frequency spectrum distribution image 160 represents the maximum spatial frequency.

A center portion in the vicinity of the center 162 of the spatial frequency spectrum distribution image 160 represents a region in which a low frequency component spectrum 166 is present. A peripheral portion in the vicinity of the corner 164 of the spatial frequency spectrum distribution image 160 represents a region in which a high frequency component spectrum 168 is present.

The center portion in the vicinity of the center 162 of the spatial frequency spectrum distribution image 160 is a region that includes the center 162 of the spatial frequency spectrum distribution image 160. The center portion is determined depending on the low frequency component.

The peripheral portion in the vicinity of the corner 164 of the spatial frequency spectrum distribution image 160 is a region that includes the corner 164 of the spatial frequency spectrum distribution image 160. The peripheral portion is determined depending on the high frequency component.

The high frequency component and the low frequency component are appropriately determined depending on the resolution of the image. Any high frequency component and low frequency component that represent a relative relationship between frequency components may be used. The unit of the spatial frequency is represented using the multiplicative inverse of the unit of a length. The unit of the length may be millimeter or inch.

Figure 7:
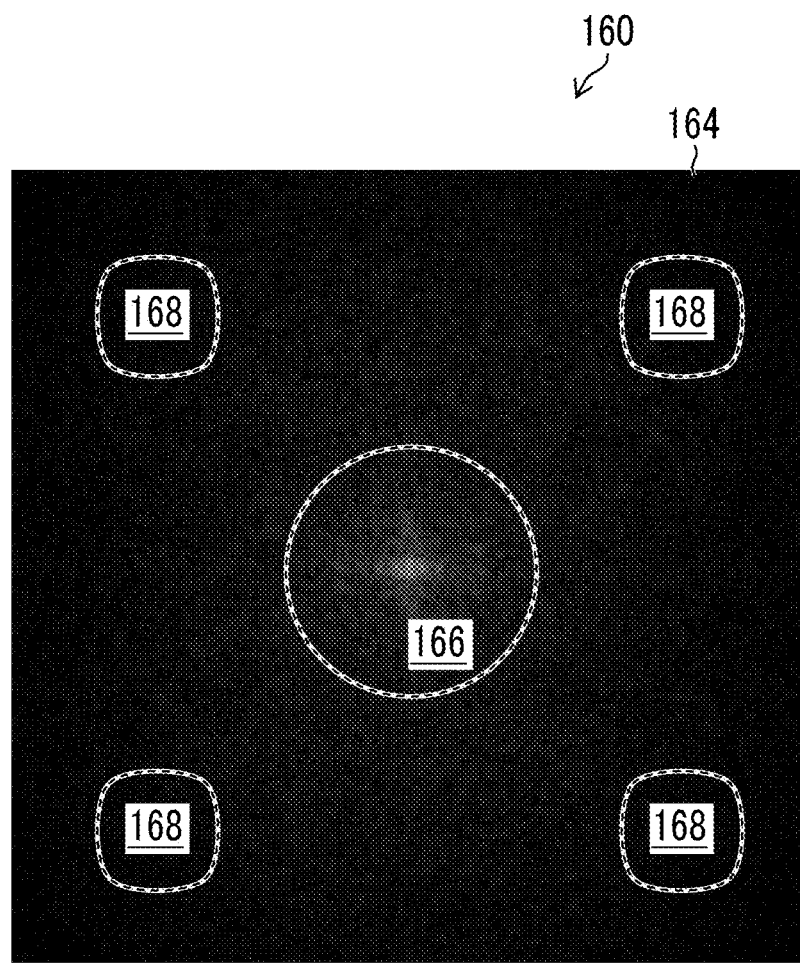
FIG. 7 is a diagram illustrating one example of the spatial frequency spectrum distribution image in a case where the analysis region is a normal image.

FIG. 7 is a diagram illustrating one example of the spatial frequency spectrum distribution image in a case where the analysis region is a normal image. The normal image means a non-out-of-focus image. In a case where the analysis region is the normal image, the low frequency component spectrum 166 and the high frequency component spectrum 168 are present in the spatial frequency spectrum distribution image 160.

Figure 8:
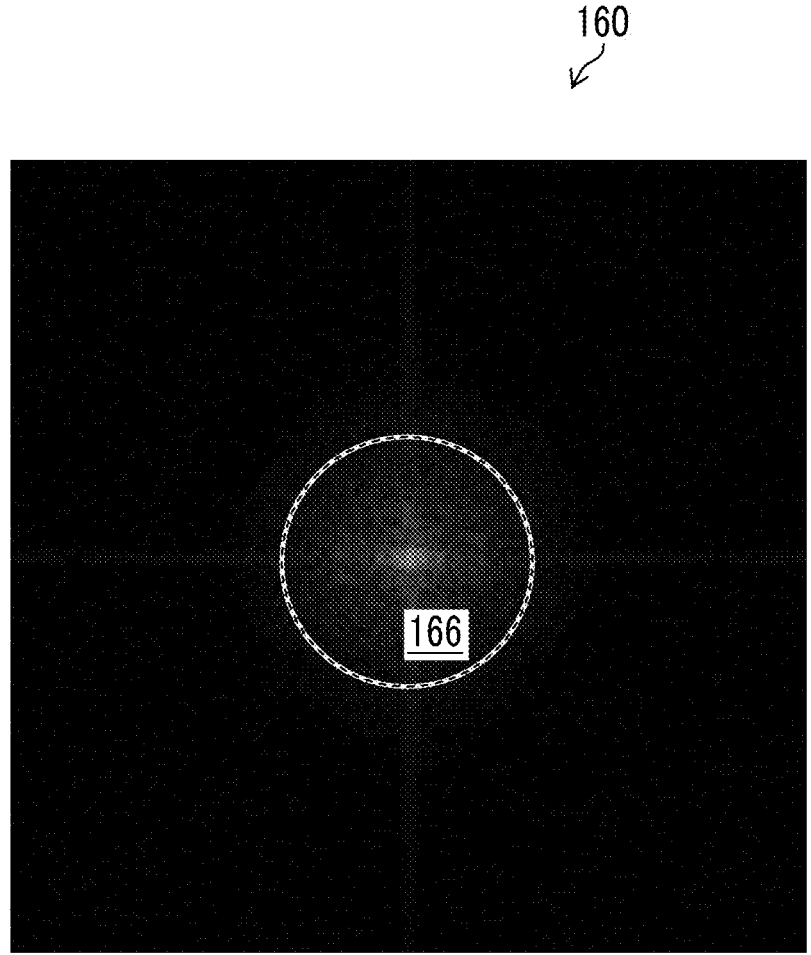
FIG. 8 is a diagram illustrating one example of the spatial frequency spectrum distribution image in a case where the analysis region is a blurred image or a shaky image.

FIG. 8 is a diagram illustrating one example of the spatial frequency spectrum distribution image in a case where the analysis region is a blurred image or a shaky image. As illustrated in FIG. 8, in a case where the analysis region is a blurred image that is out of focus or a shaky image that is shaky, the low frequency component spectrum 166 is present in the spatial frequency spectrum distribution image 160, but the high frequency component spectrum 168 is not present.

Accordingly, a determination as to whether to set the analysis region as the temporary image processing target region or the image processing target exclusion region may be performed depending on the presence or absence of the high frequency component spectrum 166 of the spatial frequency spectrum distribution image 160 derived from each analysis region.

The analysis region corresponding to the spatial frequency spectrum distribution image 160 illustrated in FIG. 7 is one example of a high image quality region that is determined based on the spatial frequency spectrum distribution. The analysis region corresponding to the spatial frequency spectrum distribution image 160 illustrated in FIG. 8 is one example of a low image quality region that is determined based on the spatial frequency spectrum distribution.

Figure 9:
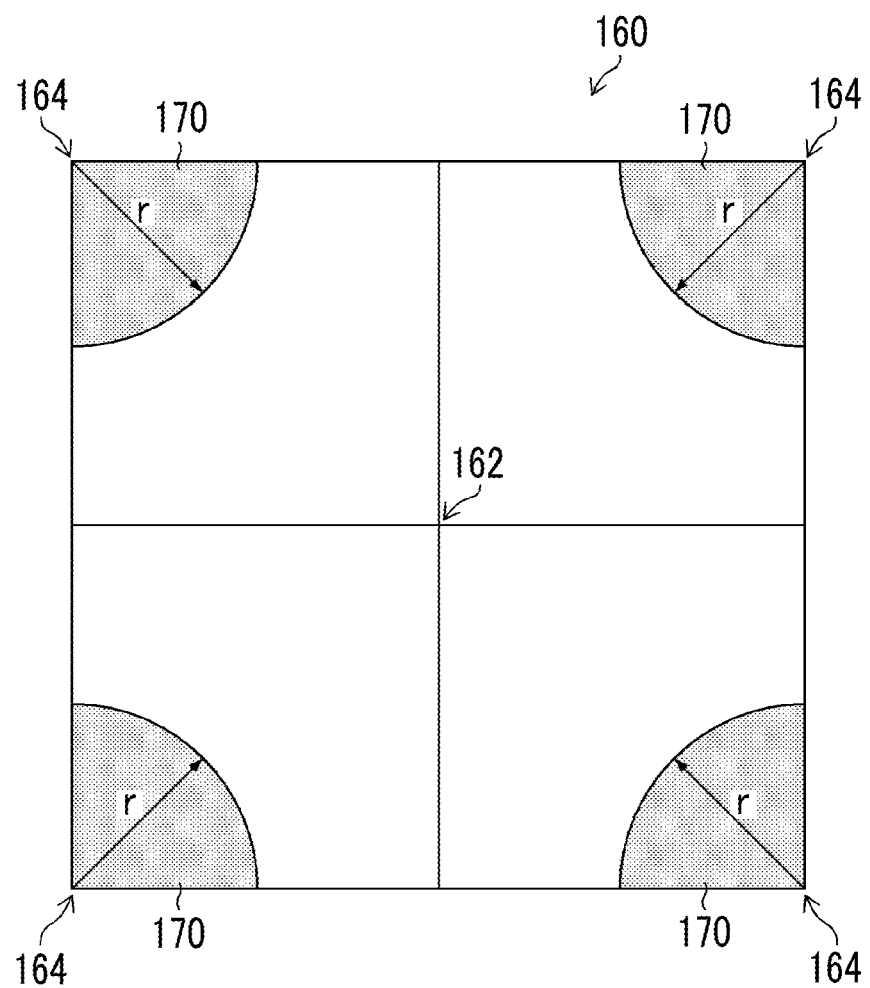
FIG. 9 is a diagram illustrating one example of a high frequency component determination region.

FIG. 9 is a diagram illustrating one example of a high frequency component determination region. As illustrated in FIG. 9, the range of r pixels from each corner 164 of the spatial frequency spectrum distribution image 160 is set as a high frequency component determination region 170.

In a case where a spectrum is present in the high frequency component determination region 170, it may be determined that the high frequency component spectrum is present in the spatial frequency spectrum distribution image 160. In a case where the high frequency component spectrum is present in the spatial frequency spectrum distribution image 160, it is determined that the analysis region is a non-out-of-focus region or a non-shaky region. The non-out-of-focus analysis region or the non-shaky analysis region is decided as the temporary image processing target region.

Meanwhile, in a case where a spectrum is not present in the high frequency component determination region 170, it may be determination the high frequency component spectrum is not present in the spatial frequency spectrum distribution image 160. In a case where the high frequency component spectrum is not present in the spatial frequency spectrum distribution image 160, it is determined that the analysis region is an out-of-focus region or a shaky region. The out-of-focus analysis region or the shaky analysis region is decided as the image processing target exclusion region. The spatial frequency spectrum distribution image 160 is one example of the spatial frequency spectrum distribution.

A determination threshold value is denoted by r that decides the high frequency component determination region 170. The determination threshold value may be a predetermined value that is set in advance, or a designated value that may be designated by the user. An example of the determination threshold value is exemplified by ¼ of the number of pixels of the analysis region in the longitudinal direction or ¼ of the number of pixels of the analysis region in the lateral direction. For example, in a case where the number of pixels of the analysis region in the longitudinal direction is 100, and the number of pixels of the analysis region in the lateral direction is 100, the determination threshold value r may be set to 25 pixels. Here, ¼ is for illustrative purposes. An arbitrary ratio may be applied.

While an example in which the determination threshold value is represented using the number of pixels is illustrated in FIG. 9, a length in millimeters or the like may be used for the determination threshold value. The number of pixels may be represented as pixels.

<Another Example of Image Quality Analysis Process>

Figure 10:
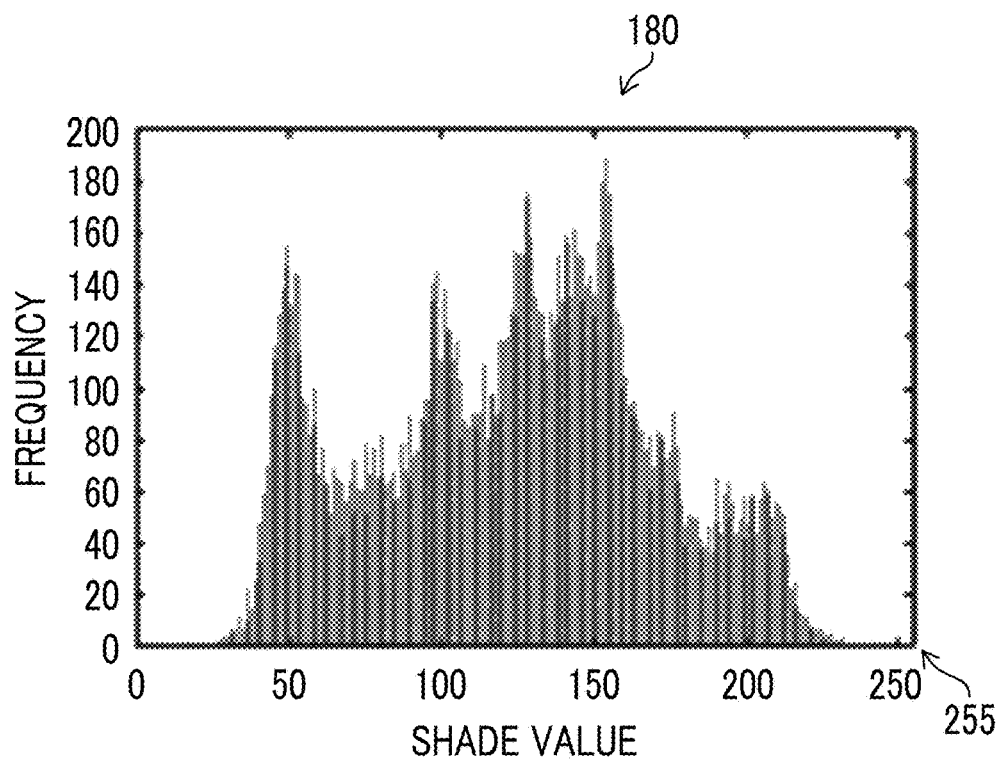
FIG. 10 is a diagram illustrating one example of a shade histogram.

Next, the acquisition of the shade histogram in each analysis region will be described as another example of the image quality analysis process result. FIG. 10 is a diagram illustrating one example of the shade histogram. A shade histogram 180 illustrated in FIG. 10 is obtained by converting the analysis region from a color image represented using R, G, and B into a gray scale image and calculating the shade histogram of the gray scale image.

The shade value of each pixel of the gray scale image is calculated using R×0.30+G×0.59+B×0.1. In the expression, R denotes the shade value of red. G denotes the shade value of green. B denotes the shade value of blue. A color conversion look-up table from RGB into a gray scale can be applied in the conversion from the color image into the gray scale image. The conversion from the color image into the gray scale image is for illustrative purposes. Other conversion expressions for conversion into an image from which the shade histogram can be calculated may be used.

The horizontal axis of the shade histogram 180 of the analysis region illustrated in FIG. 10 denotes the shade value. The vertical axis of the shade histogram 180 denotes a frequency. The shade value is represented using the absolute value of 0 to 255. The shade value 0 represents the highest darkness. The shade value 255 represents the highest brightness.

In a case where the analysis region is excessively dark, the frequency of the shade histogram 180 is biased to a dark side. In a case where the analysis region is excessively bright, the frequency of the shade histogram 180 is biased to a bright side.

A determination as to whether each analysis region is an excessively bright region or an excessively dark region can be performed using the shade histogram of each analysis region. The histogram of each shade value is denoted by $G(i)$. The shade value is denoted by i. In the present embodiment, an integer greater than or equal to 0 and smaller than or equal to 255 is used for i.

A shade value threshold value of the excessively bright region is denoted by $k_b$, and a pixel threshold value of the excessively bright region is denoted by $h_b$. The analysis region that satisfies Expression 1 below may be determined as the excessively bright region. The excessively bright region may be set as the image processing target exclusion region.

$$\frac{\sum_{j=k_b}^{255} G(j)}{\sum_{i=0}^{255} G(i)} \geq h_b$$

That is, in a case where the ratio of the number of pixels having the shade value $k_b$ or higher to the total number of pixels of the analysis region is greater than or equal to $h_b$, the analysis region is determined as the excessively bright region. The shade value threshold value $k_b$ of the excessively bright region and the pixel threshold value $h_b$ of the excessively bright region may be predetermined values that are set in advance, or may be designated values that may be designated by the user.

An example of the shade value threshold value $k_b$ of the excessively bright region is exemplified by 205. An example of the pixel threshold value $h_b$ of the excessively bright region is exemplified by 0.5. In a case where 50 percent of all pixels of the analysis region have the shade value of 205 or higher, the analysis region is determined as the excessively bright region. The excessively bright region is set as the image processing target exclusion region.

The shade threshold value of the excessively dark region is denoted by $k_d$, and the pixel threshold value of the excessively dark region is denoted by $h_d$. The analysis region that satisfies Expression 2 below may be determined as the excessively dark region. The excessively dark region may be set as the image processing target exclusion region.

$$\frac{\sum_{j=0}^{k_d} G(j)}{\sum_{i=0}^{255} G(i)} \geq h_d$$

An example of the shade threshold value $k_d$ of the excessively dark region is exemplified by 50. An example of the pixel threshold value $h_d$ of the excessively dark region is exemplified by 0.5. In a case where 50 percent of all pixels of the analysis region has the shade value of 50 or lower, the analysis region is determined as the excessively dark region. The excessively dark region is set as the image processing target exclusion region.

Meanwhile, a region that is not determined as the excessively bright region, and a region that is not determined as the excessively dark region may be set as the temporary image processing target region. That is, the analysis region that does not satisfy the condition illustrated in Expression 1 and the condition illustrated in Expression 2 may be set as the temporary image processing target region.

The region that is not determined as the excessively bright region, and the region that is not determined as the excessively dark region are one example of a high image quality region that is determined based on a histogram of a gradation value. The shade histogram 180 is one example of the histogram of the gradation value.

The frequency of the analysis region having broken gradation on a shade side is present at the shade value 0 of the shade histogram 180. The frequency of the analysis region having broken gradation on a highlight side is present at the shade value 255 of the shade histogram 180.

That is, in a case where a determination threshold value for broken gradation on the shade side is denoted by $T_d$, the analysis region that satisfies $G(0)>T_d$ may be determined as the region having broken gradation on the shade side. The region having broken gradation on the shade side may be set as the image processing target exclusion region.

In addition, in a case where a determination threshold value for broken gradation on the highlight side is denoted by $T_b$, the analysis region that satisfies $G(255)>T_b$ may be determined as the region having broken gradation on the highlight side. The region having broken gradation on the highlight side may be set as the image processing target exclusion region.

Meanwhile, a region that is not determined as the region having broken gradation on the shade side, and a region that is not determined as the region having broken gradation on the highlight side may be set as the temporary image processing target region. That is, the analysis region that does not satisfy $G(0)>T_d$ and $G(255)>T_b$ may be set as the temporary image processing target region.

The analysis region that does not satisfy $G(0)>T_d$ and $G(255)>T_b$ is one example of the high image quality region that is determined based on the histogram of the gradation value.

[Description of Decision of Temporary Image Processing Target Region Using Imaging Condition]

<Example in which Imaging Angle and Focus Position are Used>

Next, decision of the temporary image processing target region using the imaging condition will be described. First, an example in which the imaging angle and the focus position are used as the imaging condition will be described.

Figure 11:
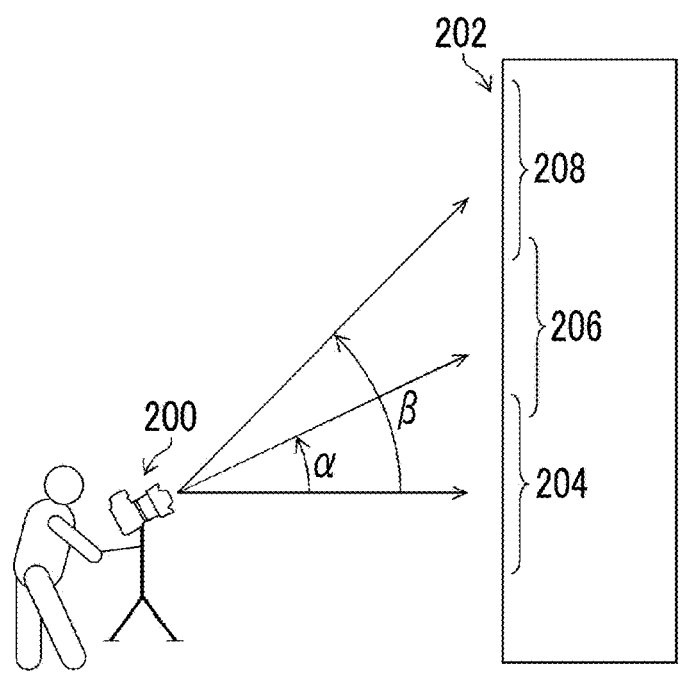
FIG. 11 is a schematic diagram of imaging of a subject.

FIG. 11 is a schematic diagram of imaging of the subject. In FIG. 11, imaging of a subject 202 using an imaging apparatus 200 is schematically illustrated. A divided image 204 is an image that is obtained by imaging the subject 202 by setting the direction of the optical axis of the imaging apparatus 200 to a direction parallel to the horizontal direction.

A divided image 206 is an image that is obtained by performing the tilt operation of the imaging apparatus 200, directing the optical axis of the imaging apparatus 200 by α degrees upward with respect to the horizontal direction, and imaging the subject 202. A divided image 208 is an image that is obtained by performing the tilt operation of the imaging apparatus 200, directing the optical axis of the imaging apparatus 200 by β degrees upward with respect to the horizontal direction, and imaging the subject 202. The angle α and the angle β have a relationship of α<β.

FIG. 12 is a diagram illustrating one example of the temporary image processing target region in a case where a focus area is the center of an imaging range. In FIG. 12, three divided images that are obtained by imaging a bridge 210 as a main subject are illustrated. A circle of a broken line that is designated by reference sign 212 and illustrated in FIG. 12 represents the focus area in the divided image 204, the divided image 206, and the divided image 208. The center of the focus area is the focus position.

A frame designated by reference sign 214 in the divided image 206 and the divided image 208 represents a boundary between a non-out-of-focus region that is in focus with respect to the bridge 210, and an out-of-focus region that is not in focus with respect to the bridge 210. The inside of the frame 214 is the non-out-of-focus region, and the outside of the frame 214 is the out-of-focus region. The frame 214 is included in the non-out-of-focus region.

In the divided image 206 and the divided image 208 illustrated in FIG. 12, a region that is separated upward from a focus area 212 deviates from the depth of field and is out of focus. The divided image 208 that is above the divided image 206 and has a larger imaging angle than the divided image 206 has a larger area of the out-of-focus region than the divided image 206.

FIG. 13 is a diagram illustrating one example of the temporary image processing target region in a case where the focus area is positioned below the center of the imaging range. The focus area 212 of a divided image 204A illustrated in FIG. 13 is positioned below the focus area 212 of the divided image 204 illustrated in FIG. 12. The same applies to a divided image 206A and a divided image 208A illustrated in FIG. 13.

The divided image 206A illustrated in FIG. 13 has a larger area of the out-of-focus region than the divided image 206 illustrated in FIG. 12. The same applies to the divided image 208A illustrated in FIG. 13.

That is, a region that is separated from the focus position in a direction in which the angle with respect to the subject changes deviates from the depth of field and is out of focus. In a case where the imaging angle with respect to the imaging apparatus as a reference extends in the up-down direction of the imaging apparatus by performing the tilt operation of the imaging apparatus, at least one of the upper end portion and the lower end portion of the divided image is out of focus.

In a case where the imaging angle with respect to the imaging apparatus as a reference extends in the left-right direction of the imaging apparatus by performing the pan operation of the imaging apparatus, at least one of the right end portion and the left end portion of the divided image is out of focus. The up-down direction may be read as the longitudinal direction. The left-right direction may be read as the lateral direction.

In FIG. 12, a non-out-of-focus region 204B of the divided image 204, a non-out-of-focus region of the divided image 206 designated by reference sign 206B, and a non-out-of-focus region of the divided image 208 designated by reference sign 208B may be decided as the temporary image processing target region.

The relationship among the focus position, the imaging angle, and the non-out-of-focus region is stored as a database in the image processing target region database 42 illustrated in FIG. 3. Information of the non-out-of-focus region in the divided image may be acquired from the image processing target region database 42 illustrated in FIG. 3 using the focus position and the imaging angle.

A non-main subject such as a background in the divided image 204, the divided image 206, and the divided image 208 illustrated in FIG. 12 is the actual out-of-focus region. However, since the final result is generated by performing the process with focus on the main subject, the temporary image processing target region may be decided by focusing on blurriness or shake of the main subject. The non-main subject may be included in the temporary image processing target region.

In other words, all divided images can be handled as the same plane, and the temporary image processing target region in the divided image can be decided based on blurriness or shake of the main subject.

<Example in which Depth of Field and Focal Point Shift Amount are Calculated>

Next, another example of the decision of the temporary image processing target region using the imaging condition will be described. Hereinafter, an example in which the imaging angle, the focus position, the depth of field, the focal length, the F number, and the permissible circle of confusion are used as the imaging condition will be described.

Specifically, the depth of field and a focal point shift amount that represents the distance of a focal point shift in the imaging range are calculated, and a region 229 of which the focal point shift amount falls in the depth of field is decided as the temporary image processing target region. A region in which the focal point shift amount does not fall in the depth of field is decided as the image processing target exclusion region. An illustration of the region in which the focal point shift amount does not fall in the depth of field is not provided.

Figure 14:
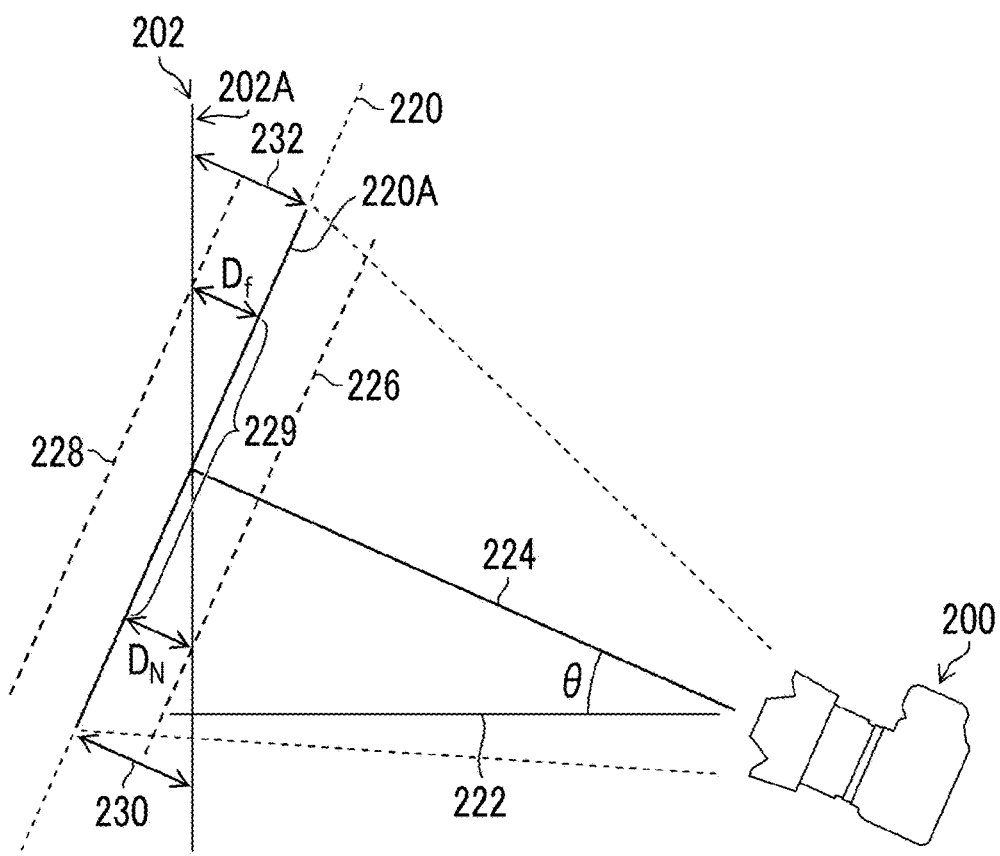
FIG. 14 is a schematic diagram illustrating a relationship between a focal point shift amount and a depth of field.

FIG. 14 is a schematic diagram illustrating a relationship between the focal point shift amount and the depth of field. Reference sign $D_N$ illustrated in FIG. 14 denotes a front depth of field. Reference sign $D_f$ denotes a rear depth of field. The front depth of field $D_N$ is represented using Expression 3 below. The rear depth of field $D_f$ is represented using Expression 4 below. The depth of field is represented using Expression 5 below.

$$\text{Front depth of field} = \frac{\text{Diameter of permissible circle of confusion} \times F\text{ number} \times \text{Subject distance}^2}{\text{Focal length} + \text{Diameter of permissible circle of confusion} \times F\text{ number} \times \text{Subject distance}}$$

$$\text{Rear depth of field} = \frac{\text{Diameter of permissible circle of confusion} \times F\text{ number} \times \text{Subject distance}^2}{\text{Focal length}^2 - \text{Diameter of permissible circle of confusion} \times F\text{ number} \times \text{Subject distance}}$$

$$\text{Depth of field} = \text{Front depth of field} + \text{Rear depth of field}$$

In a case where the front depth of field $D_N$ in Expression 3, the rear depth of field $D_f$ in Expression 4, and the depth of field in Expression 5 are in units of millimeters, the permissible circle of confusion diameter, the subject distance, and the focal length in Expression 3 and Expression 4 are in units of millimeters.

The permissible circle of confusion diameter means the diameter of the permissible circle of confusion. The size of the imaging element comprised in the imaging apparatus 200 is applied as the permissible circle of confusion diameter.

Reference sign 220 in FIG. 14 denotes an in-focus plane of the imaging apparatus 200. A solid line designated by reference sign 220A represents the imaging range of the imaging apparatus 200. The imaging range in the longitudinal direction is calculated by dividing a value obtained by multiplying the subject distance with the size of the sensor in the longitudinal direction by the focal length. A unit that represents a length is used for the imaging range in the longitudinal direction.

The longitudinal direction represents a direction in which a broken line representing the in-focus plane 220 illustrated in FIG. 14 is directed. The size of the sensor in the longitudinal direction is the size of the imaging element comprised in the imaging apparatus 200 in the longitudinal direction.

The imaging range in the lateral direction is calculated by dividing a value obtained by multiplying the subject distance with the size of the sensor in the lateral direction by the focal length. A unit that represents a length is used for the imaging range in the lateral direction.

The lateral direction represents a direction that is orthogonal to the longitudinal direction and passes through the page of FIG. 14. The size of the sensor in the lateral direction is the size of the imaging element comprised in the imaging apparatus 200 illustrated in FIG. 14 in the lateral direction. An imaging angle θ is the angle between a subject plane perpendicular direction 222 and a direction 224 of the optical axis of the imaging apparatus 200. The subject plane perpendicular direction 222 is the direction of a line normal to a subject plane 202A.

Reference sign 226 illustrated in FIG. 14 denotes the front end of the depth of field. Reference sign 228 denotes the rear end of the depth of field. Reference sign 230 denotes the focal point shift amount in front of the in-focus plane 220. Reference sign 232 denotes the focal point shift amount behind the in-focus plane 220. The focal point shift amount can be calculated a distance from the subject plane 202A to the in-focus plane 220 using geometric calculation.

The imaging condition acquisition unit 40 illustrated in FIG. 3 includes a depth of field calculation unit and a focal point shift amount calculation unit. Illustrations of the depth of field calculation unit and the focal point shift amount calculation unit are not provided.

Figure 15:
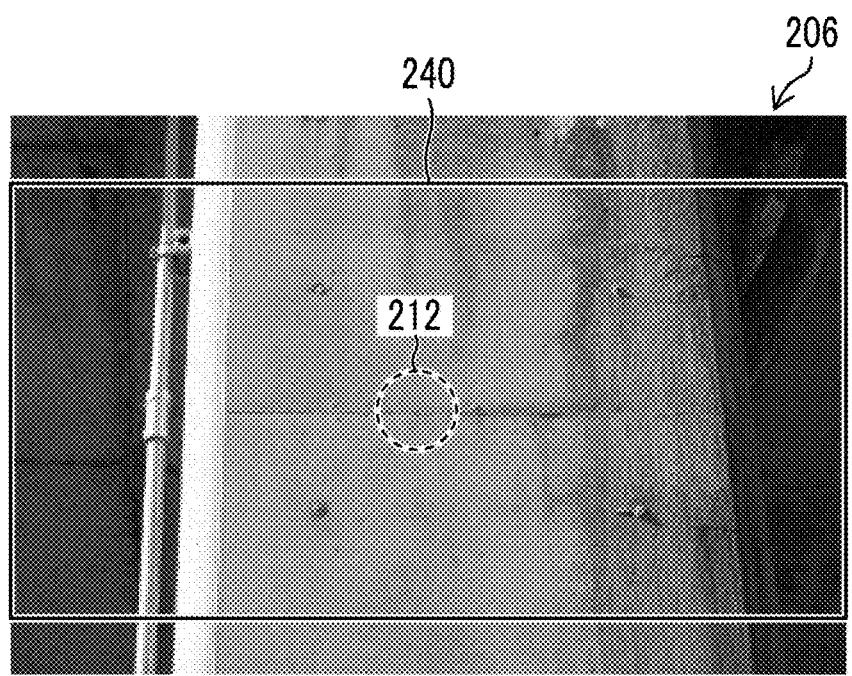
FIG. 15 is a diagram illustrating one example of a region in the depth of field in a case where the focus area is the center of the imaging range.

FIG. 15 is a diagram illustrating one example of a region in the depth of field in a case where the focus area is the center of the imaging range. In FIG. 15, a temporary image processing target region 240 that is decided based on the depth of field and the focal point shift amount in the divided image 206 illustrated in FIG. 12 is illustrated.

Figure 16:
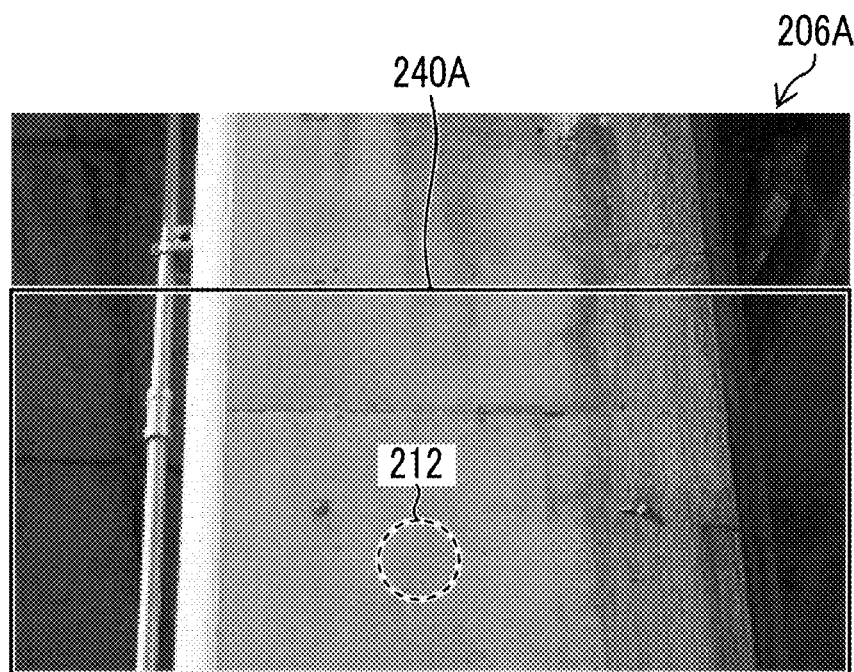
FIG. 16 is a diagram illustrating one example of the region in the depth of field in a case where the focus area is positioned below the center of the imaging range.

FIG. 16 is a diagram illustrating one example of the region in the depth of field in a case where the focus area is positioned below the center of the imaging range. In FIG. 16, a temporary image processing target region 240A that is decided based on the depth of field and the focal point shift amount in the divided image 206A illustrated in FIG. 13 is illustrated.

<Example in which Type of Lens and Focus Position are Used>

Next, another example of the decision of the temporary image processing target region using the imaging condition will be described. Hereinafter, an example in which the type of lens and the focus position are used as the imaging condition will be described. In a case where the imaging apparatus is a fixed lens type, the type of lens may be specified using the type of camera.

Figure 17:
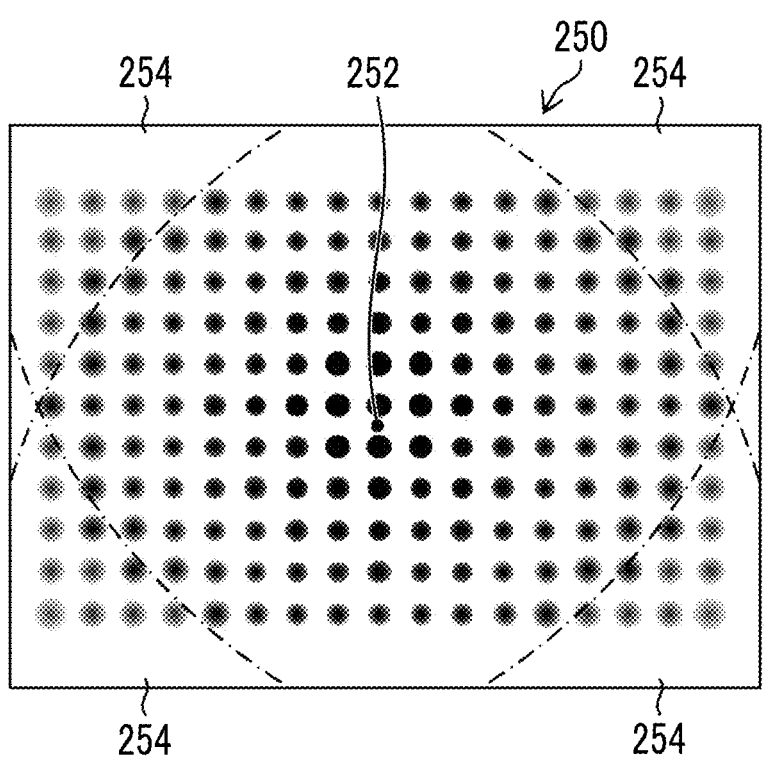
FIG. 17 is a diagram illustrating one example of a field curvature in a case where the focus area is the center of the imaging range.

FIG. 17 is a diagram illustrating one example of a field curvature in a case where the focus area is the center of the imaging range. In a case where the field curvature caused by the characteristics of the lens occurs, a center 252 of an imaging range 250 or a position in the vicinity of the center 252 is in focus, and a peripheral portion 254 of the imaging range 250 is out of focus.

Figure 18:
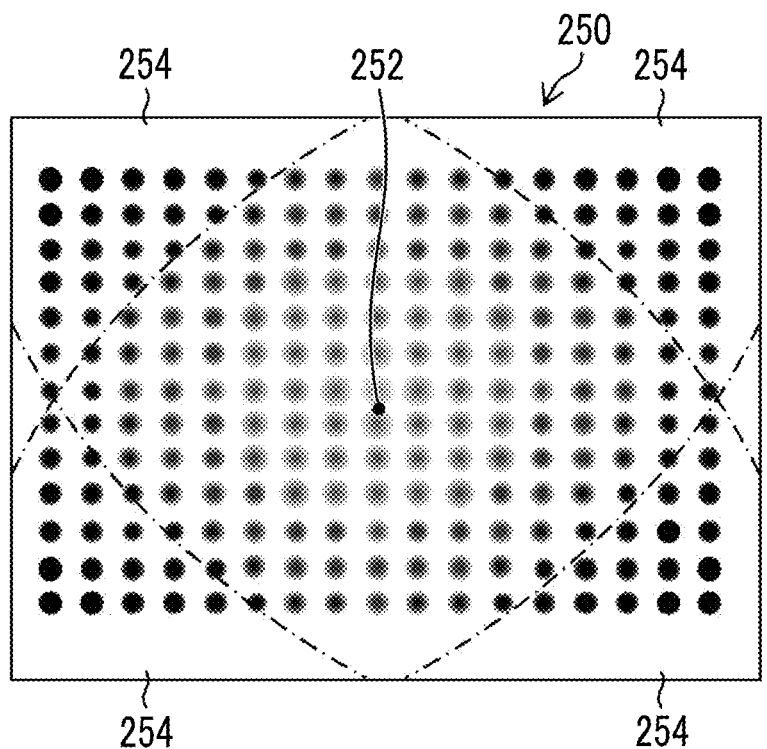
FIG. 18 is a diagram illustrating one example of the field curvature in a case where the focus area is a peripheral portion of the imaging range.

FIG. 18 is a diagram illustrating one example of the field curvature in a case where the focus area is the peripheral portion of the imaging range. In a case where the field curvature caused by the characteristics of the lens occurs, the center 252 of the imaging range 250 or the vicinity of the center 252 of the imaging range 250 is out of focus in a case where the peripheral portion 254 of the imaging range 250 is in focus. The vicinity of the center 252 of the imaging range 250 is a range including the center 252 of the imaging range 250. The vicinity of the center 252 of the imaging range 250 is decided depending on the type of lens.

Figure 19:
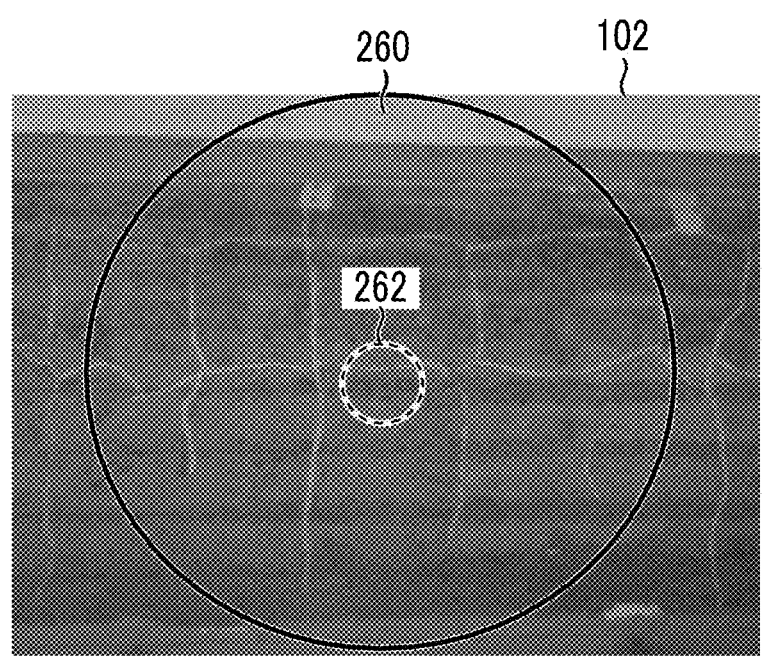
FIG. 19 is a diagram illustrating one example of a non-out-of-focus region in which the effect of the field curvature is considered in a case where the focus area is the center of the imaging range.
Figure 20:
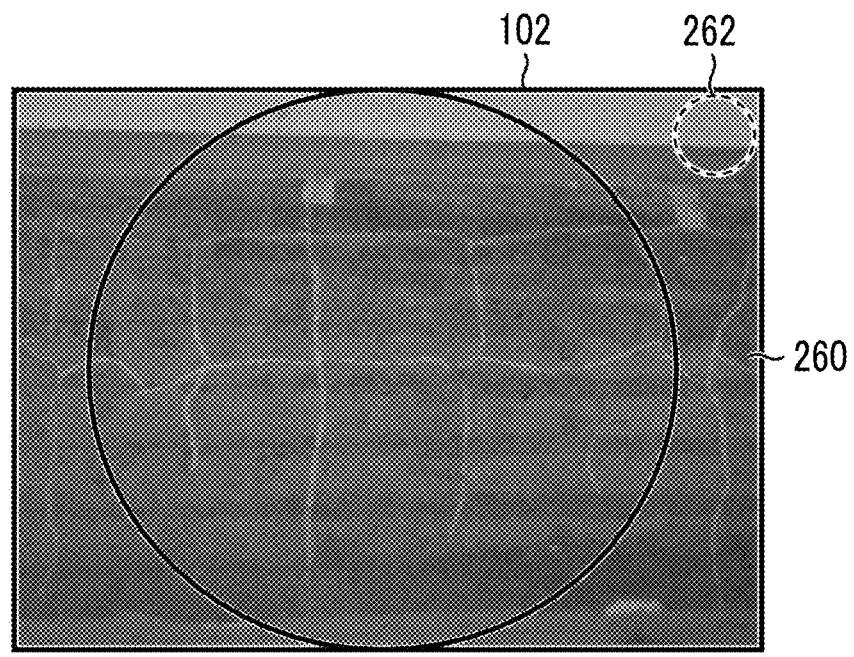
FIG. 20 is a diagram illustrating one example of the non-out-of-focus region in which the effect of the field curvature is considered in a case where the focus area is the peripheral portion of the imaging range.

FIG. 19 is a diagram illustrating one example of the non-out-of-focus region in which the effect of the field curvature is considered in a case where the focus area is the center of the imaging range. FIG. 20 is a diagram illustrating one example of the non-out-of-focus region in which the effect of the field curvature is considered in a case where the focus area is the peripheral portion of the imaging range.

FIG. 19 and FIG. 20 illustrate one example of a non-out-of-focus region 260 in which the effect of the field curvature is considered in the divided image 102 illustrated in FIG. 2. Reference sign 262 illustrated in FIG. 19 and FIG. 20 denotes the focus area.

Figure 21:
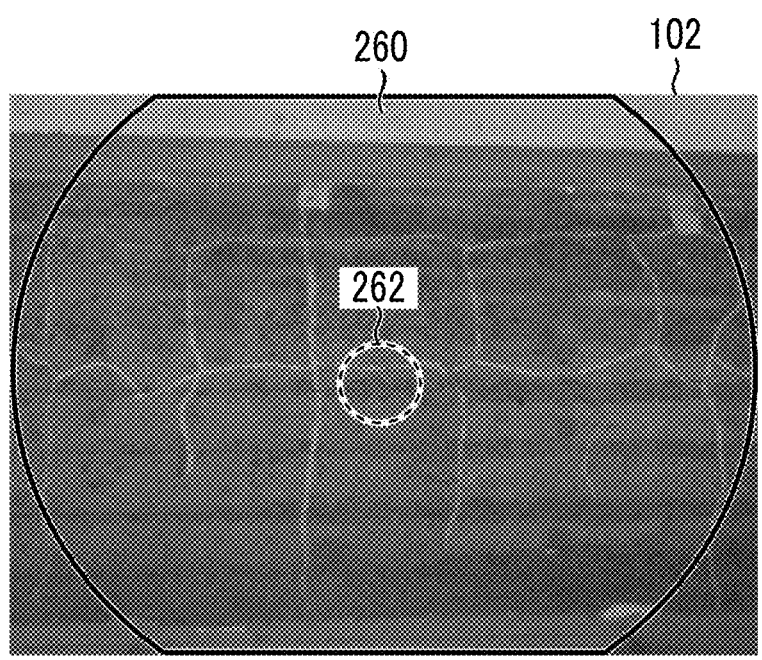
FIG. 21 is a diagram illustrating another example of the non-out-of-focus region in which the effect of the field curvature is considered in a case where the focus area is the center of the imaging range.

FIG. 21 is a diagram illustrating another example of the non-out-of-focus region in which the effect of the field curvature is considered in a case where the focus area is the center of the imaging range. The non-out-of-focus region 260 illustrated in FIG. 21 may be decided depending on the characteristics of the lens.

The relationship among the type of lens, the focus position, and the non-out-of-focus region is stored as a database in the image processing target region database 42 illustrated in FIG. 3. Information of the non-out-of-focus region in the divided image may be acquired from the image processing target region database 42 illustrated in FIG. 3 using the type of lens and the focus position.

The non-out-of-focus region 260 illustrated in FIG. 19 and FIG. 21 is one example of a region that includes the center portion and is determined from the characteristics of the lens. The non-out-of-focus region 260 illustrated in FIG. 20 is one example of a region that includes the peripheral portion and is determined from the characteristics of the lens.

<Example in which Presence or Absence of Strobe Light Emission is Used>

Next, another example of the decision of the temporary image processing target region using the imaging condition will be described. Hereinafter, an example in which the presence or absence of strobe light emission is used as the imaging condition will be described. Specifically, the peripheral portion is dark in the strobe light emission. Thus, a bright region other than the peripheral portion is set as the temporary image processing target area. The dark area which is the peripheral portion is set as the image processing target exclusion region.

Figure 22:
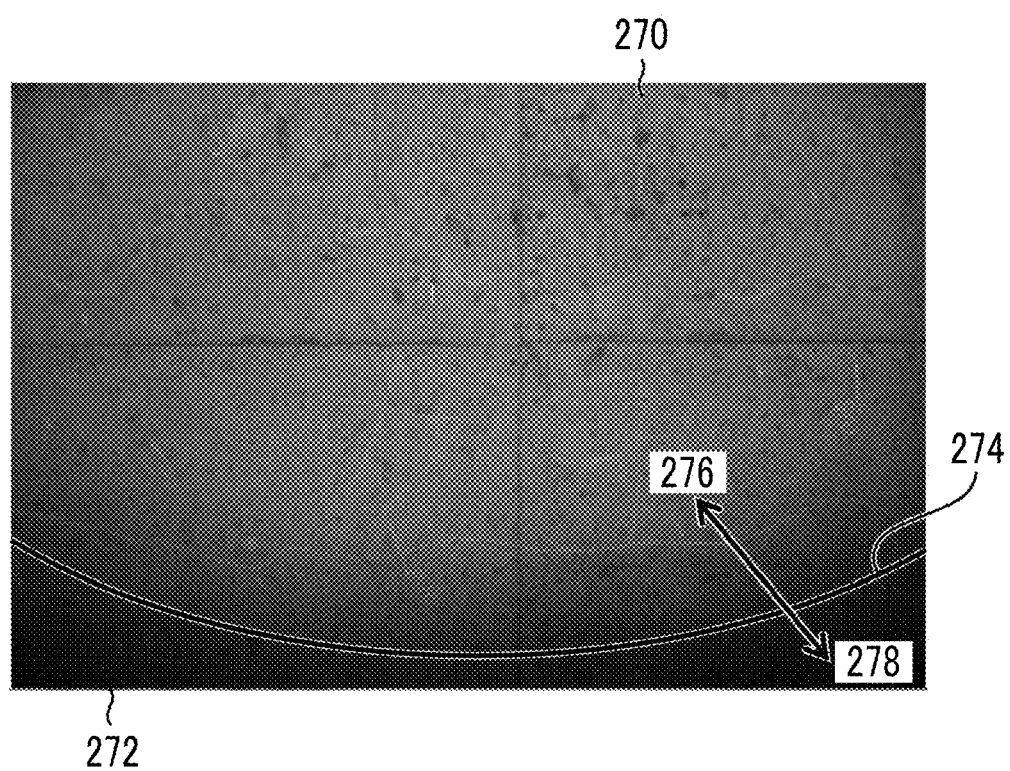
FIG. 22 is a diagram illustrating one example of a bright region and a dark region in strobe light emission.

FIG. 22 is a diagram illustrating one example of the bright region and the dark region in the strobe light emission. A strobe light reaching region 270 that is a region in which strobe light radiated to the subject from a strobe arrives in the strobe light emission is the bright region. A strobe light non-reaching region 272 that is a region in which the strobe light does not arrive in the strobe light emission is the dark region.

A region that is likely to be dark differs depending on the position of the strobe in the imaging apparatus. For example, in a case where the strobe is arranged in the upper portion of the imaging apparatus, the lower side of the captured image is likely to be dark. In a case where the subject distance is relatively decreased, the bright region is relatively decreased. In a case where the subject distance is relatively increased, the bright region is relatively increased.

Reference sign 274 illustrated in FIG. 22 denotes a boundary between the strobe light reaching region 270 and the strobe light non-reaching region 272. In a case where the subject distance is relatively short, the boundary 274 moves in a direction indicated by an arrow line designated by reference sign 276.

That is, the boundary 274 in a case where the subject distance is relatively decreased moves in a direction in which the area of the strobe light reaching region 270 is relatively decreased and the area of the strobe light non-reaching region 272 is relatively increased.

In a case where the subject distance is relatively increased, the boundary 274 moves in a direction indicated by an arrow line designated by reference sign 278. That is, the boundary 274 in a case where the subject distance is relatively increased moves in a direction in which the area of the strobe light reaching region 270 is relatively increased and the area of the strobe light non-reaching region 272 is relatively decreased.

The relationship between the subject distance and the strobe light reaching region 270 or the strobe light non-reaching region 272 is stored in advance as a database in the image processing target region database 42 illustrated in FIG. 3. Information of the strobe light reaching region 270 or the strobe light non-reaching region 272 in the divided image may be acquired from the image processing target region database 42 illustrated in FIG. 3 using the subject distance.

[Description of Decision of Image Processing Target Region]

Figure 23:
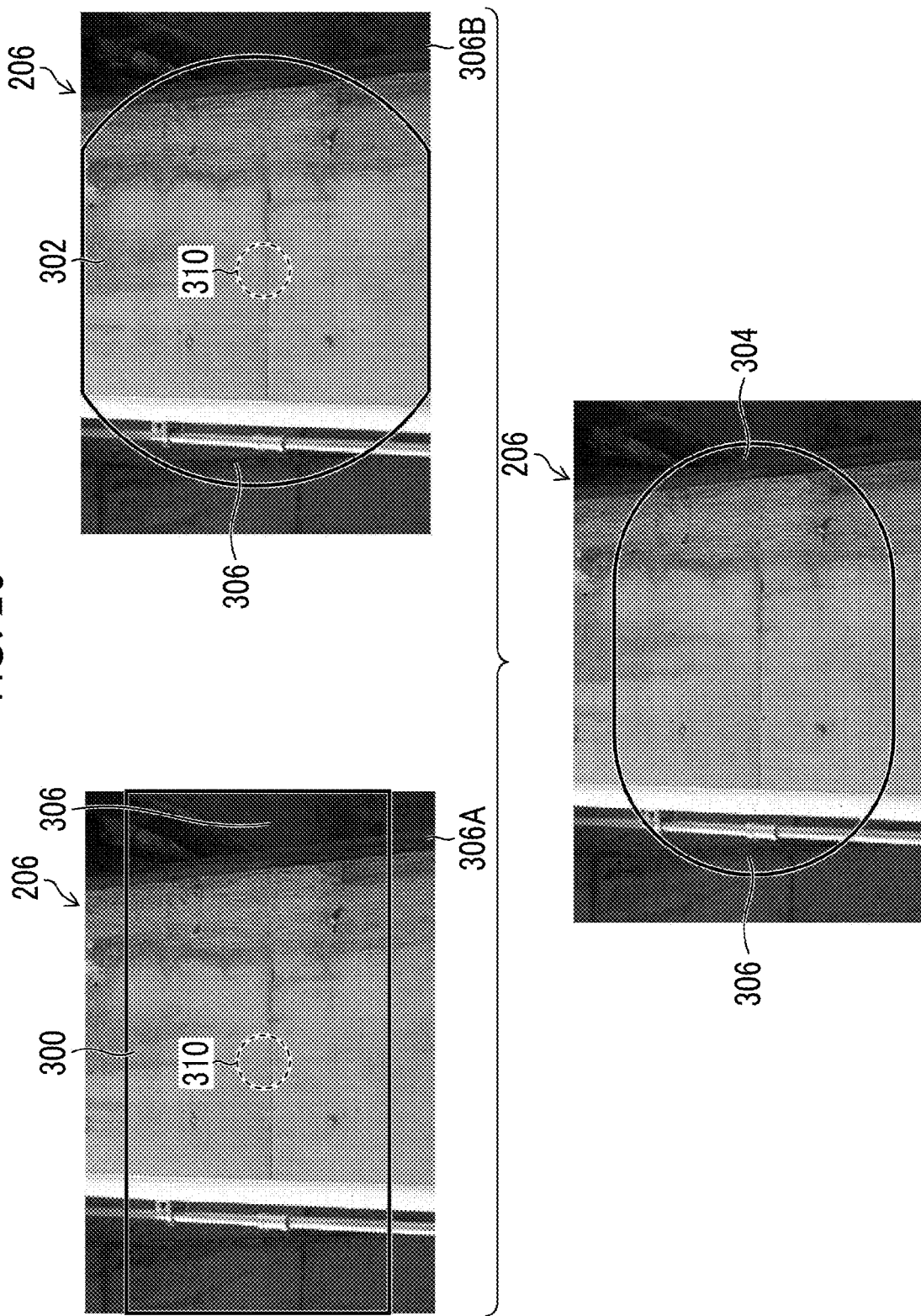
FIG. 23 is a diagram illustrating one example of the image processing target region based on a logical product of two temporary image processing target regions.

Next, decision of the image processing target region will be described. FIG. 23 is a diagram illustrating one example of the image processing target region based on the logical product of two temporary image processing target regions. In FIG. 23, an image processing target region 304 that is decided by combining a first temporary image processing target region 300 which is decided using the imaging angle with a second temporary image processing target region 302 which is decided using the lens characteristics is illustrated for the divided image 206 illustrated in FIG. 12. Reference sign 310 illustrated in FIG. 23 denotes the focus area in the divided image 206.

In the example illustrated in FIG. 23, in the divided image 206, it is assumed that the first temporary image processing target region 300 based on the imaging angle corresponds to 1, and an image processing target exclusion region 306A corresponds to 0. In addition, in the divided image 206, it is assumed that the second temporary image processing region 302 based on the lens characteristics corresponds to 1, and an image processing target exclusion region 306B corresponds to 0.

A region that is represented using the logical product of the first temporary image processing target region 300 and the second temporary image processing target region 302 based on the effect of each factor is set as the image processing target region 304 of the divided image 206.

In other words, in the divided image 206, it is assumed that the first temporary image processing target region 300 based on the imaging angle corresponds to 0, and the image processing target exclusion region 306A corresponds to 1. In addition, in the divided image 206, it is assumed that the second temporary image processing region 302 based on the lens characteristics corresponds to 0, and an image processing target exclusion region 306B corresponds to 1.

A region that is represented using the logical product of the image processing target exclusion region 306A and the image processing target exclusion region 306B based on the effect of each factor is set as an image processing target exclusion region 306 of the divided image 206.

The image processing target region 304 of the divided image 206 illustrated in the lower part of FIG. 23 is decided by superimposing the effect of the imaging angle and the effect of the lens characteristics. In FIG. 23, an example in which the image processing target region is decided as the logical product of two different types of temporary image processing target regions which are decided using two different types of imaging conditions is illustrated.

The image processing target region may be decided using the temporary image processing target region which is decided using the image quality analysis result, and the temporary image processing target region which is decided using the imaging condition. The image processing target region may be decided as the logical product of two different types of temporary image processing regions which are decided using two different types of image quality analysis results.

The logical product may include an aspect in which the first temporary image processing target region is decided, and then, the second temporary image processing target region is decided by limiting the processing region to the first temporary image processing target region. For example, the first temporary image processing target region may be decided for the divided image based on the imaging condition, and the image processing target region may be decided by acquiring the image quality analysis result using the decided first temporary image processing target region as a target.

[Image Processing]

An image processing method according to the present embodiment is applied to only damage detection, only image composition, and both of the damage detection and the image composition. Both of the damage detection and the image composition includes composition of the damage detection result. Hereinafter, the damage detection and the image composition will be described in detail.

<Damage Detection Process>

In a damage detection process, damage is detected for the image processing target region in the image obtained by capturing using the imaging apparatus. A damage detection apparatus that is prepared in advance is applied in the damage detection. In the damage detection process, the damage detection is executed for the image processing target region using the damage detection apparatus.

An example of the subject as a target of the damage detection is exemplified by a structure such as a wall, a pillar, a ceiling, and a window of a building, a road, a tree, a rock face, a sea surface, a ship, a vehicle, and the like.

An example of damage in the wall and the pillar of the building is exemplified by a crevice of a concrete member, free lime, water leakage, stripping, rebar exposure, a float, a crack of a steel member, corrosion, a chalk line drawn on the wall or the like, and the like. Another example of the damage is exemplified by breakage, loss, a hole, discoloration, peeling of a coating, corrosion, and the like in the structure.

<Image Composition Process>

An image composition process includes an image association step and an image combining step. The image association process step includes a feature point extraction step, a correspondence point extraction step, and a projective transformation matrix calculation step.

An image association process is executed for all divided images. An image combining process may be executed for only the image processing target region. The image combining process may be executed by prioritizing the image processing target region.

In the image combining process, a blending process or an overwriting process is executed for a superimposed region that extends in two divided images. The blending process or the overwriting process is executed for only pixels included in the image processing target region.

The blending process is a process of blending the pixels of the two divided images included in the superimposed region in accordance with a predetermined blending process rule. The overwriting process is a process of overwriting the superimposed region using the pixels of any one of the two divided images constituting the superimposed region. In other words, the overwriting process is a process of replacing the superimposed region with any one of the two divided images constituting the superimposed region.

In a case where the superimposed region does not include the image processing target region, the pixels of the image processing target exclusion region may be used in the processing of the superimposed region. In a case where the superimposed region does not include the image processing target region, the pixel values of the superimposed region may be set to a predetermined value.

An example of the predetermined value is exemplified by a pixel value representing black and a pixel value representing white. An example of the pixel value representing black is exemplified by the minimum pixel value. An example of the pixel value representing white is exemplified by the maximum pixel value.

The pixels of each divided image are used in a single region that is a region other than the superimposed region and is configured using a single divided image.

Figure 24:
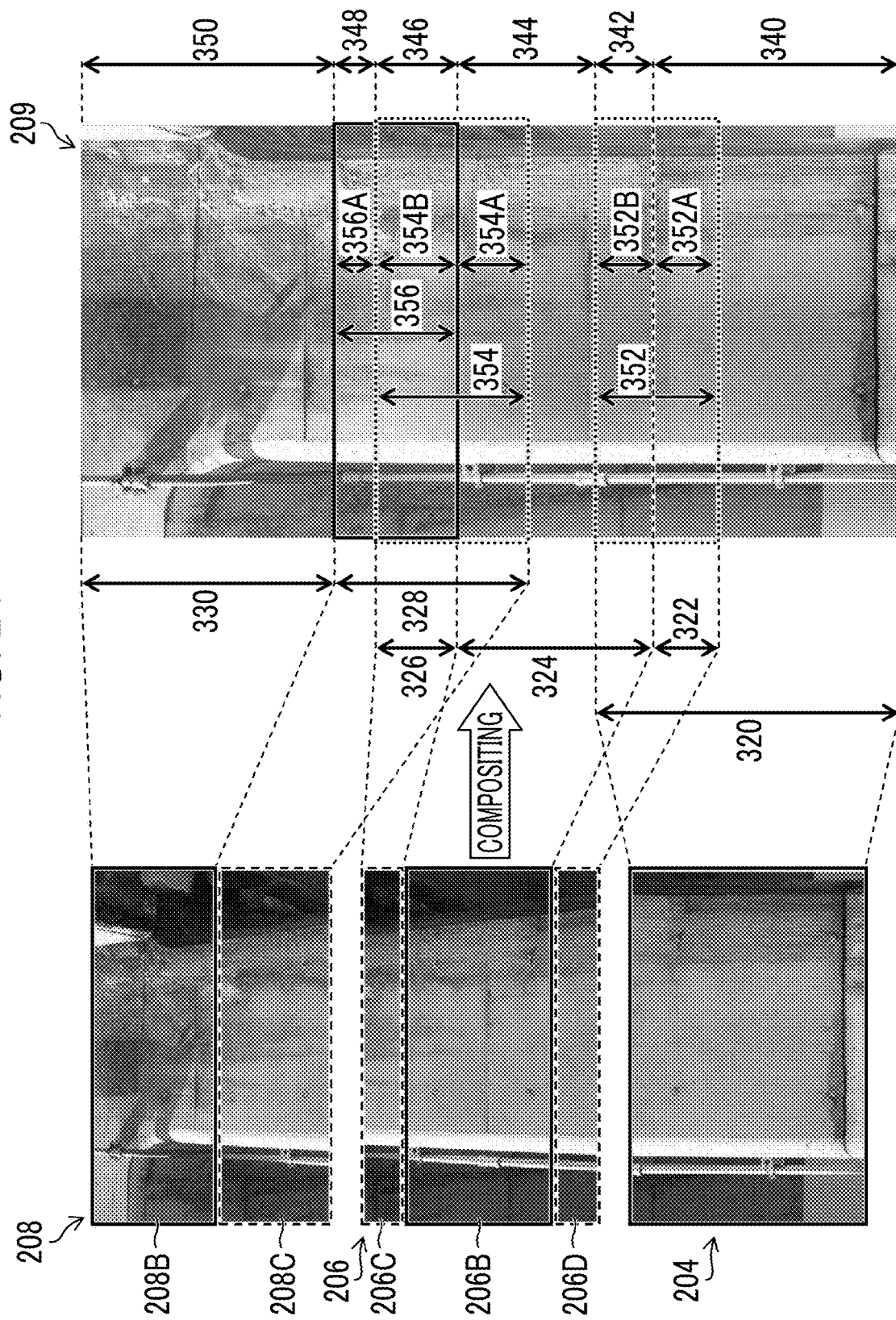
FIG. 24 is a description of one example of an image composition process.

FIG. 24 is a description of one example of the image composition process. Hereinafter, an example in which the divided image 204, the divided image 206, and the divided image 208 illustrated in FIG. 12 are composited will be described. Reference sign 209 in FIG. 24 denotes a composite image that represents a composition result obtained by compositing the divided image 204, the divided image 206, and the divided image 208.

In the image association process step, an association among the divided image 204, the divided image 206, the divided image 208, and the composite image 209 is decided. First, in the feature point extraction step, the feature point of each of the divided image 204, the divided image 206, and the divided image 208 is extracted. Specifically, the coordinates of the feature point are extracted. The coordinates are coordinates set in the divided image 204, the divided image 206, and the divided image 208. For example, the coordinates are exemplified by coordinates in a two-dimensional orthogonal coordinate system.

Next, in the correspondence point extraction step, a correspondence point that corresponds to the feature point of each of the divided image 204, the divided image 206, and the divided image 208 in the composite image 209 is extracted. In the projective transformation matrix calculation step, the coordinates of the correspondence point corresponding to the coordinates of the feature point of each of the divided image 204, the divided image 206, and the divided image 208 in the composite image 209 are calculated. Details of the projective transformation matrix calculation are disclosed in Paragraph 0053 of JP2004-072533A.

A region 320 in the composite image 209 illustrated in FIG. 24 is a region that corresponds to the divided image 204. A region 322 in the composite image 209 is a region that corresponds to an image processing target exclusion region 206D on the lower side of the divided image 206.

A region 324 in the composite image 209 is a region that corresponds to the image processing target region 206B of the divided image 206. A region 326 in the composite image 209 is a region that corresponds to an image processing target exclusion region 206C on the upper side of the divided image 206.

A region 328 in the composite image 209 is a region that corresponds to an image processing target exclusion region 208C of the divided image 208. A region 330 in the composite image 209 is a region that corresponds to the image processing target region 208B of the divided image 208.

By doing so, the correspondence relationship among the divided image 204, the divided image 206, the divided image 208, and the composite image 209 is derived.

In the image combining step, a combining process of combining the divided image 204, the divided image 206, and the divided image 208 is executed. The blending process or the overwriting process is executed for a superimposed region 352 in the composite image 209.

The superimposed region 352 is configured with a region 352A and a region 352B. The region 352A is a region in which the divided image 204 and the image processing target exclusion region of the divided image 206 extend. In the region 352A, the pixels of the divided image 204 are employed. The region 352B is a region in which the divided image 204 and the image processing target region 206B of the divided image 206 extend. In the region 352B, the pixels of the divided image 204 may be used, or the pixels of the image processing target region 206B of the divided image 206 may be used. In the region 352B, the pixels of the divided image 204 and the pixels of the image processing target region 206B of the divided image 206 may be blended.

A superimposed region 354 is configured with a region 354A and a region 354B. The region 354A is a region in which the image processing target region 206B of the divided image 206 and the image processing target exclusion region 208C of the divided image 208 extend. In the region 354A, the pixels of the image processing target region 206B of the divided image 206 are used.

The region 354B is a region in which the image processing target exclusion region 206C of the divided image 206 and the image processing target exclusion region 208C of the divided image 208 extend. In the region 354B, the pixels of the image processing target exclusion region 206C of the divided image 206 may be used, or the pixels of the image processing target exclusion region 208C of the divided image 208 may be used.

In the region 354B, the pixels of the image processing target exclusion region 206C of the divided image 206 and the pixels of the image processing target exclusion region 208C of the divided image 208 may be blended. A predetermined pixel value such as the pixel value representing white or the pixel value representing black may be applied in the region 354B.

A region 356A is a region that corresponds to the image processing target exclusion region 208C of the divided image 208. In the region 356A, the pixels of the image processing target exclusion region 208C of the divided image 208 may be used, or a predetermined pixel value such as the pixel value representing white or the pixel value representing black may be applied.

The image processing target exclusion region 356 in the composite image 209 is configured with the region 354B and the region 356A. A process rule for the image processing target exclusion region is used for the image processing target exclusion region 356. An example of the process rule for the image processing target exclusion region is exemplified by the process for the region 354B and the process for the region 356A.

The following process rule is applied in the image combining process. In a case where a plurality of image processing target regions are present, the blending process or the pixels of any one image processing target region are employed. This rule applies to the region 324 in the composite image 209 illustrated in FIG. 24.

In a case where one image processing target region is present, the pixels of the image processing target region are employed. This rule applies to a region 340, a region 344, and a region 350 in the composite image 209 illustrated in FIG. 24.

In a case where the image processing target region is not present, the blending process, the pixels of any one image processing target exclusion region, or the predetermined pixel value is employed. This rule applies to a region 346 and a region 348 in the composite image 209 illustrated in FIG. 24.

<Damage Detection Process and Image Composition Process>

In a case where the damage detection process and the image composition process are executed, a process of compositing the damage detection result may be executed. An example of the composition of the damage detection result is exemplified by an example in which a crevice is detected in each of the divided image 204, the divided image 206, and the divided image 208 illustrated in FIG. 24, and the divided image 204, the divided image 206, and the divided image 208 in which the crevice is detected are composited.

Figure 25:
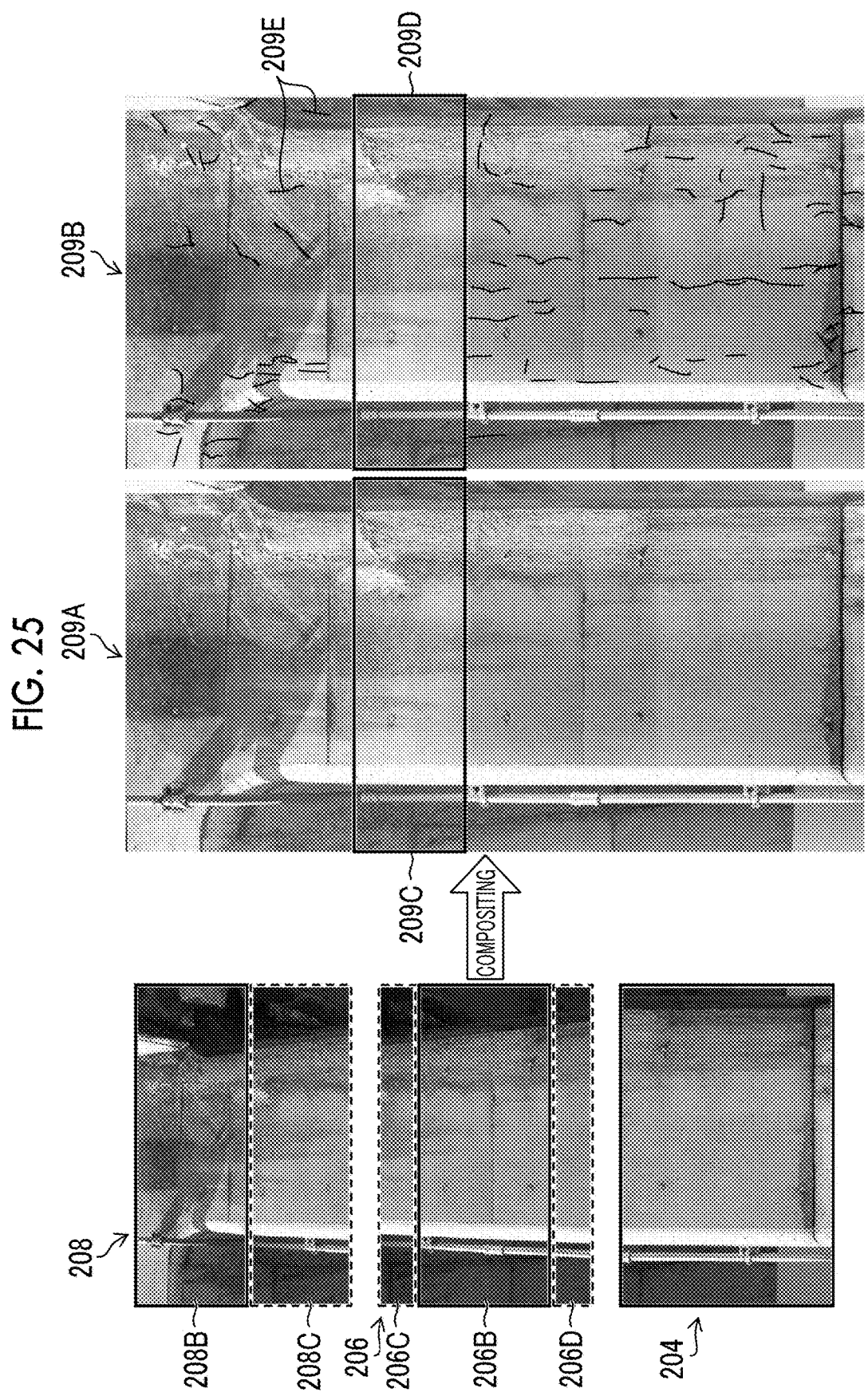
FIG. 25 is a description of a display example of an image processing result.

The composite image obtained by compositing the divided image 204, the divided image 206, and the divided image 208 in which the crevice is detected is illustrated as an image processing result image 209B in FIG. 25.

In the composition of the damage detection result, the damage detection result is composited based on the correspondence relationship between the divided images. An example of the correspondence relationship between the divided images is exemplified by the projective transformation matrix. In the superimposed region, the detection result of any divided image included in the image processing target region is employed and composited.

The image processing target region in the damage detection may be set as the image processing target region in the image composition process. The image processing target region in the image composition process may be derived separately from the image processing target region in the damage detection.

[Display of Image Processing Result]

FIG. 25 is a description of a display example of the image processing result. In FIG. 25, an image processing result image 209A that is the composite image obtained by compositing the divided image 204, the divided image 206, and the divided image 208 and in which the image processing target exclusion region is displayed distinctively from other regions is illustrated.

The image processing result image 209A or the image processing result image 209B illustrated in FIG. 25 is displayed on an image display unit, not illustrated.

In the image processing result image 209A, a frame that indicates an image processing target exclusion region 209C is displayed. In the example illustrated in FIG. 25, the pixels of the divided image 206 or the pixels of the divided image 208 are employed in the image processing target exclusion region 209C.

The image processing result image 209B illustrated in FIG. 25 is the composite image obtained by compositing the divided image 204, the divided image 206, and the divided image 208 in which the crevice is detected. In the image processing result image 209B, a crevice 209E of the detection target is displayed in a highlighted manner. The crevice 209E is not displayed in an image processing target exclusion region 209D in the image processing result image 209B.

In the display of the image processing result, in a case where the image processing target region is present in the image processing result image, the image processing target region in the divided image may be changed, and the image processing may be executed again. For example, the image processing target region 206B of the divided image 206 illustrated in FIG. 25 may be manually changed. The change of the image processing target region in the divided image is executed using an image processing target region changing unit, not illustrated.

In the change of the image processing target region in the divided image, an aspect in which imaging is performed by changing the imaging condition such as the imaging angle using the imaging apparatus and the image processing target region is set for the newly obtained divided image may be applied.

[Effect]

According to the image processing system configured as above, a region that is represented as the logical product of the first temporary image processing target region 300 and the second temporary image processing target region 302 which are two or more temporary image processing target regions respectively corresponding to two or more pieces of image quality determination information is decided as the image processing target region 304. Accordingly, the image processing target region 304 in which a plurality of causes of decrease in image quality are considered can be decided.

The temporary image processing target region is decided using at least one of the imaging condition or the image quality analysis result.

As the image quality analysis, the spatial frequency spectrum distribution may be acquired for each analysis target region, and a determination of the presence or absence of the high frequency component may be applied. A region in which the high frequency component is present may be decided as the temporary image processing target region.

As the image quality analysis, the histogram of the shade value may be acquired for each analysis target region, and the analysis of the histogram may be applied. The temporary image processing target region may be decided based on a bias in frequency of the histogram, whether or not the frequency is present at the minimum shade value, and whether or not the frequency is present at the maximum shade value.

The temporary image processing target region may be decided by applying the imaging angle and the focus position as the imaging condition. In addition, a region in which the focal point shift amount falls in the range of the depth of field may be decided as the temporary image processing target region by applying the imaging angle, the focus position, the subject distance, the focal length, the F number, and the diameter of the permissible circle of confusion as the imaging condition.

Furthermore, the in-focus region in a case where a field curvature is present in the lens may be decided as the image processing target region by applying the type of lens and the focus position as the imaging condition. In the case of the imaging apparatus of a fixed lens type, the type of lens may be specified using the model of the camera.

Furthermore, a range in which the strobe light arrives may be decided as the image processing target region by applying the presence or absence of the strobe light emission as the imaging condition. Furthermore, by applying an imaging distance as the imaging condition, the image processing target region may be decided by adjusting the range in which the strobe light arrives depending on the imaging distance.

[Application Example for Client Server Type Network System]

Figure 26:
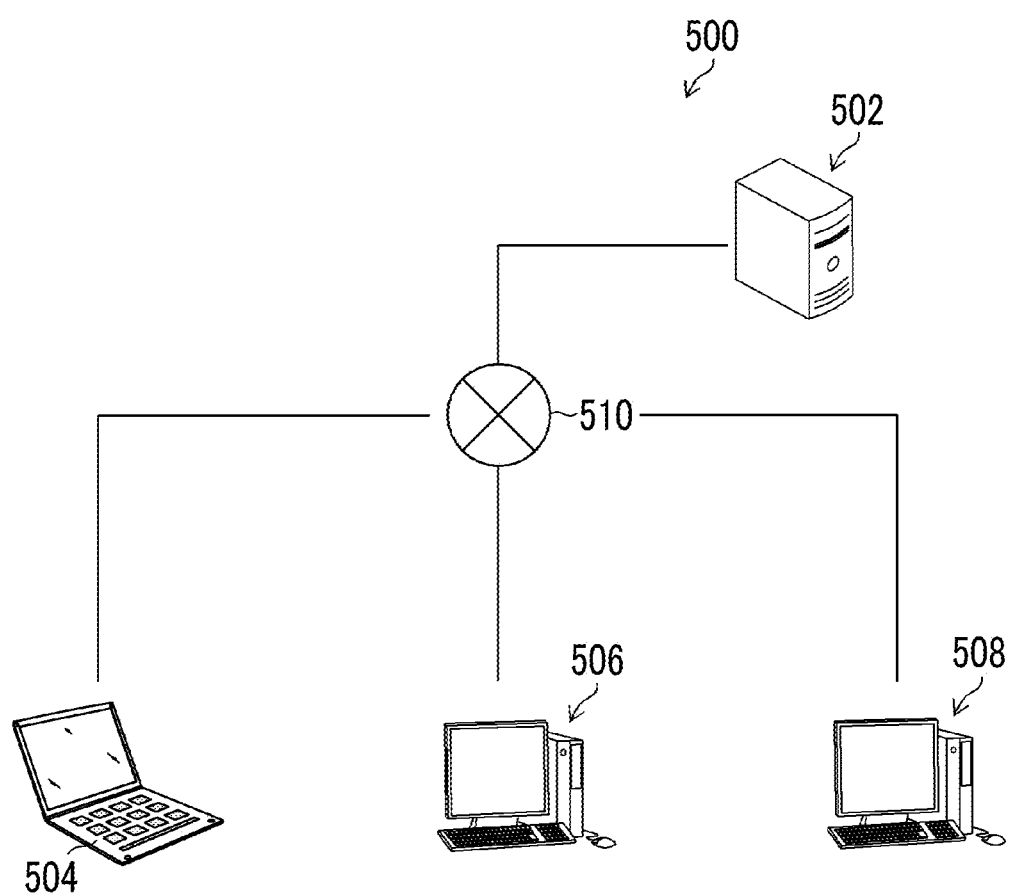
FIG. 26 is a block diagram illustrating an application example for a client server type network system.

FIG. 26 is a block diagram illustrating an application example for a client server type network system. An image processing system 500 illustrated in FIG. 26 comprises a server apparatus 502 and one or more client apparatuses. In FIG. 26, a first client apparatus 504, a second client apparatus 506, and a third client apparatus 508 are illustrated as the client apparatus.

The server apparatus 502 is communicably connected to the first client apparatus 504, the second client apparatus 506, and the third client apparatus 508 through a network 510.

Any communication network such as a public communication network and a local area network can be applied as the network 510. The local area network may be represented as LAN that is the abbreviation for English representation Local Area Network.

As data communication between the server apparatus 502 and the network 510, wired type data communication may be applied, or wireless type data communication may be applied. Similarly, as data communication between the client apparatus and the network 510, wired type data communication may be applied, or wireless type data communication may be applied.

As data communication between the client apparatus and the network 510, the same type as the data communication between the server apparatus 502 and the network 510 may be applied, or a different type may be applied.

The client apparatus is a collective term for the first client apparatus 504, the second client apparatus 506, and the third client apparatus 508 illustrated in FIG. 26. The term client apparatus may represent any of the first client apparatus 504, the second client apparatus 506, and the third client apparatus 508.

The server apparatus 502 illustrated in FIG. 26 is configured using one or more computers. Hardware that implements the function of the image processing system 10 illustrated in FIG. 1, FIG. 3, and FIG. 4 may be applied in the server apparatus 502. A configuration example of the server apparatus 502 is exemplified by an example in which a function block for acquiring machine learning data and a function block for executing the image processing illustrated in FIG. 1, FIG. 3, and FIG. 4 are comprised.

The server apparatus 502 may comprise a storage apparatus in which a database implementing the function of the image processing target region database 42 illustrated in FIG. 3 is stored. The storage apparatus may be incorporated in the server apparatus 502 illustrated in FIG. 26. Alternatively, the storage apparatus may be externally attached to the server apparatus 502.

The server apparatus 502 comprises a communication interface. The server apparatus 502 is connected to the network 510 using the communication interface. The server apparatus 502 comprises a program storage unit.

The client apparatus comprises an image data transmission unit that transmits image data to the server apparatus 502. The client apparatus comprises a communication interface. The client apparatus is connected to the network 510 using the communication interface. In FIG. 26, a computer is illustrated as an example of the client apparatus. Alternatively, a portable type terminal apparatus may be applied as the client apparatus.

[Image Processing Method]

Figure 27:
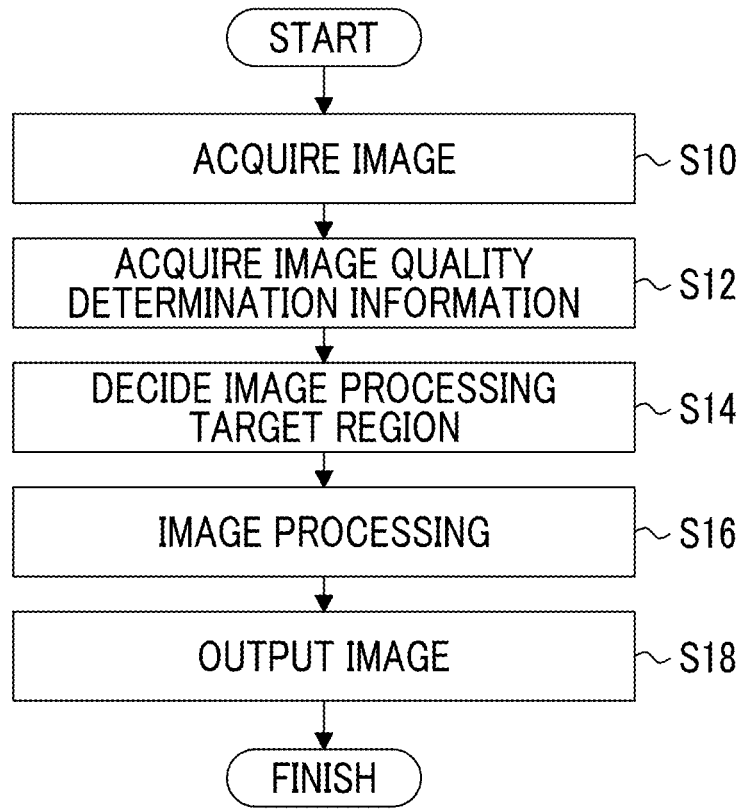
FIG. 27 is a flowchart illustrating a flow of procedure of an image processing method according to the embodiment.

FIG. 27 is a flowchart illustrating a flow of procedure of the image processing method according to the embodiment. The image processing method according to the present embodiment is configured to include an image acquisition step S10, an image quality determination information acquisition step S12, an image processing target region decision step S14, an image processing step S16, and an image output step S18.

In the image acquisition step S10, the image data 20 is acquired using the image acquisition unit 12 illustrated in FIG. 1. In the image quality determination information acquisition step S12 illustrated in FIG. 27, two different types of image quality determination information are generated and acquired using the image quality determination information acquisition unit 14 illustrated in FIG. 1. The image quality determination information acquisition step S12 illustrated in FIG. 27 may include at least one of an imaging condition acquisition step of acquiring the imaging condition or an analysis step of analyzing the image.

In the image processing target region decision step S14, the image processing target region is decided based on the two different types of image quality determination information using the image processing target region decision unit 16 illustrated in FIG. 1.

In the image processing step S16 illustrated in FIG. 27, the image processing is executed using the image processing unit 18 illustrated in FIG. 1. In the image output step S18 illustrated in FIG. 27, the image processing result is output. The image processing method is finished after the image processing result is output in the image output step S18.

Figure 28:
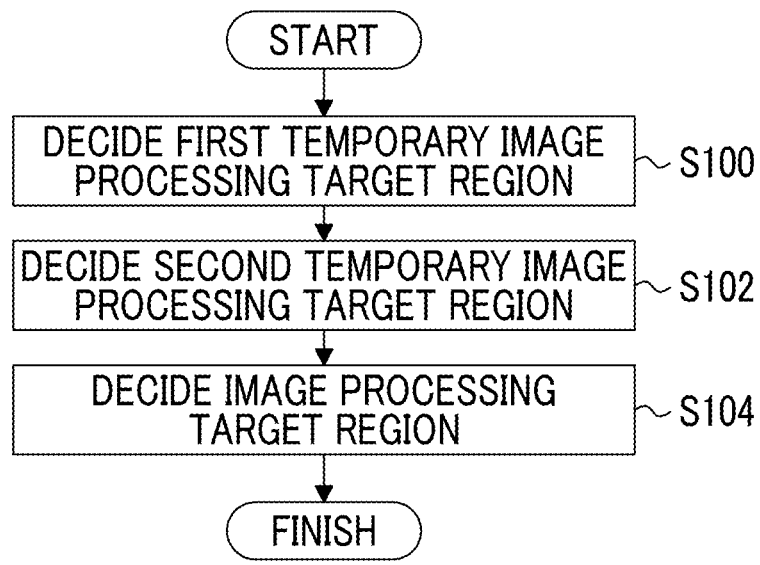
FIG. 28 is a flowchart illustrating a flow of procedure of an image processing target region decision step illustrated in FIG. 27.

FIG. 28 is a flowchart illustrating a flow of procedure of the image processing target region decision step illustrated in FIG. 27. The image processing target region decision step S14 illustrated in FIG. 27 is configured to include a first temporary image processing target region decision step S100, a second temporary image processing target region decision step S102, and an image processing target region decision step S104 illustrated in FIG. 28.

In the first temporary image processing target region decision step S100, the first temporary image processing target region in the image of the image processing target is decided based on the image quality analysis result 30 or the imaging condition using the image processing target region decision unit 16 illustrated in FIG. 1.

In the second temporary image processing target region decision step S102 illustrated in FIG. 28, the second temporary image processing target region in the image of the image processing target is decided based on the image quality analysis result 30 or the imaging condition using the image processing target region decision unit 16 illustrated in FIG. 1.

In the image processing target region decision step S104 illustrated in FIG. 28, the image processing target region that is represented as the logical product of the first temporary image processing target region and the second temporary image processing target region is decided using the image processing target region decision unit 16 illustrated in FIG. 1.

In the image processing target region decision step S104 illustrated in FIG. 28, a transition is made to the image processing step S16 illustrated in FIG. 27 after the image processing target region is decided. In the image processing step S16, at least one process of a detection target detection process or the image composition process is executed for the image of the image processing target.

[Application Example for Image Processing Program]

An image processing program that corresponds to the image processing system and the image processing method illustrated in the present embodiment may be configured. That is, an image processing program that causes a computer to implement the function of each unit of the image processing system 10 illustrated in FIG. 1, FIG. 3, and FIG. 4 may be configured.

For example, an image processing program that causes one or a plurality of computers (processors) to implement an image acquisition function corresponding to the image acquisition unit, an image quality determination information acquisition function corresponding to the image quality determination information acquisition unit, an image processing target region decision function corresponding to the image processing target region decision unit, and an image processing function corresponding to the image processing unit may be configured. A computer-readable recording medium on which the program is recorded is also included in the present embodiment.

[Terminology]

The term same in the present specification includes aspects in which the same or approximately the same effect is obtained and that may be regarded as being substantially the same among aspects that are strictly different.

The term up in the present specification refers to a direction opposite to the direction of gravity. The term down refers to the direction of gravity. Up and down may represent a relative positional relationship.

The term orthogonal in the present specification includes substantial orthogonality in which the same effect as a case where the angle formed between two intersecting directions is 90 degrees can be obtained while the angle formed between two intersecting directions is strictly smaller than 90 degrees or exceeds 90 degrees.

The term parallel in the present specification includes substantial parallelism in which the same effect as a case where two directions are strictly in parallel can be obtained while the two directions are strictly not in parallel.

Combination of Embodiment, Modification Example, and Like

Configurations described in the embodiment and matters described in the modification example can be appropriately used in combination. In addition, a part of constituents may be replaced.

In the embodiment of the present invention described thus far, constituents can be appropriately changed, added, or removed without departing from the gist of the present invention. The present invention is not limited to the embodiment described thus far. Those skilled in the art can carry out various modifications within the technical idea of the present invention.

EXPLANATION OF REFERENCES 10, 500: image processing system
12: image acquisition unit
14: image quality determination information acquisition unit
16: image processing target region decision unit
18: image processing unit
20: image data
22: EXIF information
24: user designation information
26: user selection information
28: sensor information
30: image quality analysis result
32A: first image quality determination information
32B: second image quality determination information
34: image processing target region information
40: imaging condition acquisition unit
42: image processing target region database
44: imaging condition information
50: image quality analysis result acquisition unit
54: threshold value
100, 102, 104: divided image
106: composite image
108: out-of-focus region
110, 112, 114: out-of-focus region
116, 118: superimposed region
150: analysis region
160: spatial frequency spectrum distribution image
162: center of spatial frequency spectrum distribution image
164: corner of spatial frequency spectrum distribution image
166: low frequency component spectrum
168: high frequency component spectrum
170: high frequency component determination region
180: shade histogram
200: imaging apparatus
202: subject
202A: subject plane
204, 204A: divided image
204B: non-out-of-focus region
206, 206A: divided image
206B, 208B, 304: image processing target region
206C, 206D, 208C, 209C, 209D, 306, 306A, 306B, 356: image processing target exclusion region
208, 208A: divided image
209: composite image
209A, 209B: image processing result image
210: bridge
212, 262, 310: focus area
214: frame
220: in-focus plane
220A: imaging range
222: subject plane perpendicular direction
224: direction of optical axis of imaging apparatus
226: front end of depth of field
228: rear end of depth of field
230: focal point shift amount in front of in-focus plane
232: focal point shift amount behind in-focus plane
240, 240A: temporary image processing target region
250: imaging range
252: center of imaging range
254: peripheral portion of imaging range
260: non-out-of-focus region
270: strobe light reaching region
272: strobe light non-reaching region
274: boundary between strobe light reaching region and strobe light non-reaching region
276, 278: movement direction of boundary
300: first temporary image processing target region
302: second temporary image processing target region
320, 322, 324, 326, 328, 330, 340, 342, 344, 346, 348, 350, 352A, 352B, 354A, 354B,
356A: region
352, 354: superimposed region
500: image processing system
502: server apparatus
504: first client apparatus
506: second client apparatus
508: third client apparatus
510: network
S1 to S18: each step of image processing method S100 to S114: each step of image processing target region decision step

What is claimed is:

1. An image processing system that executes at least one of a detection process of detecting a detection target which is damage in a structure and included in an image and a composition process of calculating a correspondence relationship between a plurality of images and compositing the plurality of images based on the correspondence relationship, the system comprising a processor configured to:
acquire an image obtained by capturing a subject;
acquire two or more pieces of image quality determination information, each representing a determination result of an image quality in the acquired image;
derive two or more temporary image processing target regions respectively corresponding to the two or more pieces of the acquired image quality determination information;
decide a logical product of the two or more temporary image processing target regions as an image processing target region in the acquired image; and
execute the at least one of the detection process and the composition process for the decided image processing target region.

2. The image processing system according to claim 1, wherein the processor is configured to:
perform at least one of: acquiring an imaging condition in the capturing of the acquired image, and analyzing the acquired image to obtain an analysis result of the acquired image; and
derive at least one of the two or more temporary image processing target regions using at least one of the acquired imaging condition and the obtained analysis result.

3. The image processing system according to claim 2, wherein the processor is configured to:
acquire an imaging angle and a focus position as the imaging condition; and
decide a non-end portion of the acquired image that is determined based on the imaging angle and the focus position as the at least one of the two or more temporary image processing target regions.

4. The image processing system according to claim 2, wherein the processor is configured to:
acquire an imaging angle, a focus position, a subject distance, a focal length, an F number, and a diameter of a permissible circle of confusion as the imaging condition; and
decide a non-end portion of the acquired image that is determined based on the imaging angle, the focus position, the subject distance, the focal length, the F number, and the diameter of the permissible circle of confusion as the at least one of the two or more temporary image processing target regions.

5. The image processing system according to claim 4, wherein the processor is configured to:
calculate a depth of field in an imaging range using the subject distance, the focal length, the F number, and the diameter of the permissible circle of confusion;
calculate a focal point shift amount representing a distance of a focal point shift in the imaging range using the imaging angle and the focal length; and
decide a region in which the calculated focal point shift amount falls in a range of the calculated depth of field as the at least one of the two or more temporary image processing target regions.

6. The image processing system according to claim 2, wherein the processor is configured to:
acquire a type of lens and a focus position as the imaging condition; and
based on the type of lens and the focus position, in a case where the focus position is in a center portion of an imaging range, decide a region that includes the center portion and is determined from characteristics of the lens as the at least one of the two or more temporary image processing target regions, and in a case where the focus position is in a peripheral portion of the imaging range, decide a region that includes the peripheral portion and is determined from the characteristics of the lens as the at least one of the two or more temporary image processing target regions.

7. The image processing system according to claim 2, wherein the processor is configured to:
acquire presence or absence of light emission of a strobe as the imaging condition; and
decide a strobe light reaching region in which strobe light radiated to the subject from the strobe reaches and thereby makes the strobe light reaching region brighter than a strobe light non-reaching region as the at least one of the two or more temporary image processing target regions.

8. The image processing system according to claim 7, wherein the processor is configured to:
acquire a subject distance as the imaging conditions; and
decide the strobe light reaching region that is determined depending on the subject distance as the at least one of the two or more temporary image processing target regions.

9. The image processing system according to claim 2, wherein the processor is configured to:
divide an image of an analysis target into a plurality of regions and generate a spatial frequency spectrum distribution of each region; and
decide a high image quality region that is determined based on the generated spatial frequency spectrum distribution of each region as the at least one of the two or more temporary image processing target regions.

10. The image processing system according to claim 2, wherein the processor is configured to:
divide an image of an analysis target into a plurality of regions and generate a histogram of a gradation value of each region; and
decide a high image quality region that is determined based on the generated histogram of the gradation value of each region as the at least one of the two or more temporary image processing target regions.

11. The image processing system according to claim 1, wherein the processor is configured to:
store, in a storage, a relationship between the acquired image quality determination information and each of the temporary image processing target regions in association; and
acquire each of the temporary image processing target regions corresponding to the image quality determination information from the storage using the acquired image quality determination information.

12. The image processing system according to claim 1, wherein the processor is configured to display, on an image display, an image on which the image processing is performed, and an image processing target exclusion region that is excluded from a target of the image processing.

13. The image processing system according to claim 1, wherein the processor is configured to change the decided image processing target region.

14. The image processing system according to claim 1, wherein the processor is configured to execute a process of detecting at least one of a crevice of a concrete member, a chalk line, free lime, water leakage, stripping, rebar exposure, a float, a crack of a steel member, or corrosion as the detection target.

15. The image processing system according to claim 1, further comprising:
a server apparatus; and
a client apparatus that is communicably connected to the server apparatus through a network,
wherein the server apparatus includes the processor configured to acquire the image obtained by capturing the subject, acquire the two or more pieces of image quality determination information, decide, the image processing target region, and execute the at least one of the detection process and the composition process.

16. The image processing system according to claim 15, wherein the client apparatus includes a transmitter configured to transmit image data representing the captured image to the server apparatus.

17. A server apparatus included in an image processing system that executes at least one of a detection process of detecting a detection target which is damage in a structure and included in an image and a composition process of calculating a correspondence relationship between a plurality of images and compositing the plurality of images based on the correspondence relationship, the apparatus comprising a processor configured to:
acquire an image obtained by capturing a subject;
acquire two or more pieces of image quality determination information, each representing a determination result of an image quality in the acquired image;
derive two or more temporary image processing target regions respectively corresponding to the two or more pieces of the acquired image quality determination information;
decide a logical product of the two or more temporary image processing target regions as an image processing target region in the acquired image; and
execute the at least one of the detection process and the composition process for the decided image processing target region.

18. An image processing method of executing at least one of a detection process of detecting a detection target which is damage in a structure and included in an image and a composition process of calculating a correspondence relationship between a plurality of images and compositing the plurality of images based on the correspondence relationship, the method comprising:
acquiring an image obtained by capturing a subject;
acquiring two or more pieces of image quality determination information, each representing a determination result of an image quality in the acquired image;
deriving two or more temporary image processing target regions respectively corresponding to the two or more pieces of the acquired image quality determination information;
deciding a logical product of the two or more temporary image processing target regions as an image processing target region in the acquired image; and
executing the at least one of the detection process and the composition process for the decided image processing target region.

19. The image processing method according to claim 18, wherein:
the acquiring the image quality determination information includes performing at least one of: acquiring an imaging condition in the capturing of the acquired image, and analyzing the acquired image to obtain an analysis result of the acquired image; and
the deriving the two or more temporary image processing target regions includes deriving at least one of the two or more temporary image processing target regions using at least one of the acquired imaging condition and the obtained analysis result.

20. A non-transitory, computer-readable recording medium which records an image processing program for executing at least one of a detection process of detecting a detection target which is damage in a structure and included in an image and a composition process of calculating a correspondence relationship between a plurality of images and compositing the plurality of images based on the correspondence relationship, the program causing a computer to implement:
acquiring an image obtained by capturing a subject;
acquiring two or more pieces of image quality determination information, each representing a determination result of an image quality in the acquired image;
deriving two or more temporary image processing target regions respectively corresponding to the two or more pieces of the acquired image quality determination information;
deciding a logical product of the two or more temporary image processing target regions as an image processing target region in the acquired image; and
executing the at least one of the detection process and the composition process for the decided image processing target region.

\* \* \* \* \*